US012780117B2

(12) United States Patent
Fournier et al.

(10) Patent No.: US 12,780,117 B2
(45) Date of Patent: Nov. 3, 2026

(54) ACCESSORY SYSTEM FOR VEHICLES

(71) Applicant: BOMBARDIER RECREATIONAL PRODUCTS INC., Valcourt (CA)

(72) Inventors: Eric Fournier, Orford (CA); Hugo Martin, Knowlton (CA); Maxime Dumont, Verdun (CA); Pierre-Luc Robillard, Sherbrooke (CA); Michel Bourassa, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 190 days.

(21) Appl. No.: 18/910,884

(22) Filed: Oct. 9, 2024

(65) Prior Publication Data

US 2025/0026257 A1 Jan. 23, 2025

Related U.S. Application Data

(63) Continuation of application No. 18/360,014, filed on Jul. 27, 2023, now Pat. No. 12,122,283, which is a continuation of application No. 16/915,446, filed on Jun. 29, 2020, now Pat. No. 11,738,627.

(60) Provisional application No. 62/868,436, filed on Jun. 28, 2019.

(51) Int. Cl.

| | |
|---|---|
| ***B60R 13/01*** | (2006.01) |
| ***B60J 7/14*** | (2006.01) |
| ***B60J 7/19*** | (2006.01) |
| ***B60P 7/08*** | (2006.01) |
| ***B60R 9/045*** | (2006.01) |
| ***B60R 9/06*** | (2006.01) |
| ***B62D 33/02*** | (2006.01) |

(52) U.S. Cl.

CPC ............... *B60R 13/01* (2013.01); *B60J 7/141* (2013.01); *B60J 7/198* (2013.01); *B60P 7/0815* (2013.01); *B60R 9/045* (2013.01); *B60R 9/065* (2013.01); *B62D 33/0207* (2013.01); *B60R 2013/016* (2013.01)

(58) Field of Classification Search

CPC ....... B60P 7/0815; B60R 9/045; B60R 9/048; B60R 9/06; B60R 9/08; B60R 13/01; B60R 2013/016; B62D 33/0207; B62D 33/0222

USPC ..................................................... 296/3, 39.2

See application file for complete search history.

(56) References Cited

U.S. PATENT DOCUMENTS

| | | | |
|---|---|---|---|
| 4,828,312 | A | 5/1989 | Kinkel et al. |
| 5,147,103 | A | 9/1992 | Ducote |
| 5,553,762 | A | 9/1996 | Brown |
| 5,927,783 | A | 7/1999 | Baka |
| 5,947,356 | A | 9/1999 | Delong |
| 6,158,798 | A | 12/2000 | Stedtfeld et al. |

(Continued)

*Primary Examiner* — Jason S Daniels

(74) *Attorney, Agent, or Firm* — BCF LLP

(57) ABSTRACT

A rack system for a vehicle, the vehicle having a cargo space for cargo storage, the rack system including a lining including a first lining side wall configured to extend on a left side of the vehicle and having defined therein left-side apertures and a second lining side wall configured to extend on a right side of the vehicle and having defined therein a plurality of right-side apertures; a left side foot assembly and a right side foot assembly each including an anchoring element portion for removably attaching the foot assembly to the lining side wall and a foot portion connected to the anchoring element; and at least one support member connectable to the left foot portion and to the right foot portion.

20 Claims, 48 Drawing Sheets

(56) References Cited

U.S. PATENT DOCUMENTS

| | | | | |
|---|---|---|---|---|
| 8,430,441 | B2 * | 4/2013 | Waterman | B60R 13/01 296/183.1 |
| 8,777,531 | B2 | 7/2014 | Massicotte et al. | |
| 8,875,830 | B2 | 11/2014 | Massicotte et al. | |
| 9,505,335 | B2 | 11/2016 | Massicotte et al. | |
| 9,511,704 | B2 | 12/2016 | Massicotte et al. | |
| 9,751,592 | B2 | 9/2017 | Labbe et al. | |
| 10,391,949 | B2 | 8/2019 | Labbe et al. | |
| 10,399,505 | B1 | 9/2019 | Brackman | |
| 10,414,256 | B2 | 9/2019 | Frederick et al. | |
| 10,507,874 | B2 * | 12/2019 | Crandall | B62D 33/0207 |
| 10,773,758 | B2 * | 9/2020 | Roberts | B62D 33/0207 |
| 11,117,507 | B2 | 9/2021 | Teodorof et al. | |
| 2004/0119310 | A1 * | 6/2004 | Bommarito | B60R 13/01 296/39.2 |
| 2009/0071991 | A1 | 3/2009 | Evans | |
| 2009/0096236 | A1 | 4/2009 | Hawley | |
| 2009/0214325 | A1 | 8/2009 | White | |
| 2009/0250962 | A1 | 10/2009 | Polewarczyk et al. | |
| 2012/0139281 | A1 | 6/2012 | Cousino et al. | |
| 2012/0181810 | A1 * | 7/2012 | Alvarino | B60R 13/01 296/37.6 |
| 2013/0094930 | A1 | 4/2013 | Kalergis et al. | |
| 2013/0134733 | A1 | 5/2013 | Peters | |
| 2016/0129949 | A1 | 5/2016 | Marable et al. | |
| 2018/0086277 | A1 | 3/2018 | Wilson | |
| 2018/0111542 | A1 * | 4/2018 | Mueller | B60R 9/06 |
| 2020/0269742 | A1 | 8/2020 | Teodorof et al. | |
| 2021/0138955 | A1 * | 5/2021 | Puchkoff | B60P 7/0815 |

* cited by examiner

ACCESSORY SYSTEM FOR VEHICLES

CROSS-REFERENCE

The present application is a continuation of U.S. patent application Ser. No. 18/360,014, filed Jul. 27, 2023, which is a continuation of U.S. patent application Ser. No. 16/915,446, filed Jun. 29, 2020, which claims priority from U.S. Provisional Application No. 62/868,436, filed on Jun. 28, 2019, the entirety of each of which is incorporated by reference herein.

FIELD OF TECHNOLOGY

The present technology relates to accessory systems for vehicles.

BACKGROUND

Many owners of pickup trucks and other road vehicles use their vehicles for transportation of various items and accessories, such as snowmobiles, bicycles, jerry cans and tools. In many cases, these items and accessories are secured to the vehicle using tie downs and bungee cords.

However, users may have difficulties securing items to their pickup truck using these traditional methods. Using tie downs or bungee cords can be awkward and difficult for certain items and accessories. They may also not provide a secure grip, especially on rough terrain, and items and accessories may slip off or slide around the pickup truck.

In general, use of these securing methods is inconvenient for users. Therefore, there is a need for a system to easily and securely fasten accessories and items to the pickup truck.

SUMMARY

It is an object of the present technology to ameliorate at least some of the inconveniences present in the prior art.

According to an aspect of the present technology, there is provided a tonneau system for a vehicle, the vehicle having a tonneau configured for cargo storage, the system including a lining configured to be connected to the tonneau, the lining including two side walls that extend generally parallel to a longitudinal axis of the vehicle when the lining is connected to the tonneau; and a front bar disposed at a front end of the tonneau when the lining is connected to the tonneau, the two side walls being connected by at least the front bar; and a ramp selectively connectable to the vehicle, the ramp including two ramp panels, each ramp panel being selectively connected to the lining by at least one anchor when the lining is connected to the tonneau.

In some embodiments, the ramp is selectively arrangeable in at least two positions: in an in-use position, with a front end portion of each ramp panel being selectively connected to a tailgate of the vehicle, each ramp panel extending downward and rearward from the front end portion; and in a transport position, with each ramp panel being selectively connected to a corresponding one of the two side walls.

In some embodiments, in the in-use position, the front end portion of each ramp is selectively connected to the tailgate by anchors.

In some embodiments, each ramp panel comprises at least one built-in anchor disposed in the front end portion; and in the in-use position, the front end portion of each ramp selectively connects to the tailgate using the at least one built-in anchor.

In some embodiments, the tonneau system further includes a front frame connected to the front bar, the two ramp panels being connected to the front frame when in the transport position.

In some embodiments, the front frame is fastened to the front bar by anchors.

In some embodiments, the front frame has a plurality of front frame anchor apertures defined therein, the plurality of front frame anchor apertures being configured to at least partially receive therein an anchor connected to an accessory so as to mount the accessory to the front frame.

In some embodiments, when in the transport position, each ramp panel is selectively connected to an upper edge portion of the corresponding side wall extending generally parallel to the longitudinal axis; and the front frame.

In some embodiments, each ramp panel has a plurality of ramp anchor apertures defined therein, the plurality of ramp apertures being configured to at least partially receive therein an anchor connected to an accessory so as to mount the accessory to the ramp panel.

In some embodiments, each ramp panel has a plurality of holes defined therein to form a ladder-like structure.

According to another aspect of the present technology, there is provided a vehicle including a frame; a tonneau supported by the frame; and a tonneau system according to any of the above embodiments.

According to another aspect of the present technology, there is provided an accessory system that uses anchors having common anchoring features, accessories having apertures sized and shaped to receive any anchor of the system, and attachment surfaces having apertures sized and shaped to receive any anchor of the system. As such, the system allows any accessory of the system to be attached to any attachment surface of the system using any anchor of the system. The attachment surfaces are configured for attachment to a vehicle such as a pickup truck. As a result, this system provides great flexibility and ease of use.

According to an aspect of the present technology, there is provided a tonneau cover system for a vehicle. The vehicle has a tonneau configured for cargo storage. The system includes at least two panels configured to be connected to the tonneau, the at least two panels being configured to collaboratively form a container, the at least two panels being configured to extend laterally relative to a longitudinal axis of the vehicle when the at least two panels are connected to the tonneau. The at least two panels include: a first panel that, when connected to the tonneau, is movable between an open position and a closed position to selectively gain access to an interior space defined by the container, the first panel being configured to extend generally parallel to a floor of the tonneau when the first panel is in the closed position; and a second panel that, when connected to the tonneau, is selectively placed in a cover position and a storage position. In the cover position, the second panel extends generally parallel to the floor of the tonneau to collaboratively cover at least part of the tonneau with the first panel in the closed position. In the storage position, the second panel extends generally perpendicular to the first panel when the first panel is in the closed position, the first and second panels collaboratively forming the container when the first panel is in the closed position and the second panel is in the storage position.

In some embodiments, the system also includes a lining configured to be connected to the tonneau. The lining includes two side walls that extend generally parallel to the longitudinal axis of the vehicle when the lining is connected to the tonneau. The at least two panels are connected to the tonneau by the lining.

In some embodiments, the first panel is configured to be selectively connected to the tonneau so as to be, amongst the at least two panels, closest to a front end of the tonneau.

In some embodiments, the first panel is configured to be selectively connected to the tonneau so as to be closer to a rear end of the tonneau than to a front end of the tonneau.

In some embodiments, the first panel is configured to be selectively connected to the tonneau at any one of a plurality of locations along the tonneau.

In some embodiments, each panel of the at least two panels includes a panel body; at least one panel of the at least two panels includes at least one anchor fixture connected to the panel body of the at least one panel; and each of the at least one anchor fixture defines an anchor aperture configured to at least partially receive therein an anchor connected to an accessory so as to mount the accessory to the at least one panel.

In some embodiments, the at least one panel includes the first panel and the second panel.

In some embodiments, the at least two panels includes a third panel that, when connected to the tonneau, is selectively placed in a cover position and a storage position; in the cover position of the third panel, the third panel extends generally parallel to the floor of the tonneau to collaboratively cover at least part of the tonneau with the first panel in the closed position and the second panel in the cover position; in the storage position of the third panel, the third panel extends generally perpendicular to the first panel when the first panel is in the closed position; and when the second panel is in the storage position and the third panel is in the storage position, the first panel and one of the second panel and the third panel collaboratively form the container when the first panel is in the closed position.

In some embodiments, the at least two panels includes a fourth panel that, when connected to the tonneau, is selected placed in a cover position and a storage position; in the cover position of the fourth panel: the fourth panel extends generally parallel to the floor of the tonneau to collaboratively cover at least part of the tonneau with the first panel in the closed position, the second panel in the cover position, and the third panel in the cover position; the fourth panel is closer to a rear end of the tonneau than the first, second and third panels; in the storage position of the fourth panel, the fourth panel extends generally perpendicular to the first panel when the first panel is in the closed position; each panel of the at least two panels has a panel length and a panel width; the panel width of each panel extends laterally along the vehicle when the panel is connected to the tonneau, the panel length of the panel being measured perpendicularly to the panel width; and the panel length of the fourth panel is smaller than the panel lengths of the first, second and third panels.

In some embodiments, when the second panel is in the storage position and the third panel is in the storage position, an other one of the second panel and the third panel is disposed inside the container.

In some embodiments, the first panel includes a locking device to secure the first panel in the closed position.

In some embodiments, the tonneau of the vehicle has a tonneau width measured laterally along the vehicle; each panel of the at least two panels has a panel length and a panel width, the panel width being greater than the panel length.

In some embodiments, the system also includes at least two supporting posts configured to be connected to the tonneau, each of the at least two supporting posts defining at least one slot to receive therein the second panel in the storage position.

In some embodiments, the at least one slot is a plurality of slots, the slots of the plurality of slots are configured to receive therein respective ones of the at least two panels other than the first panel.

In some embodiments, each panel of the at least two panels has a panel length and a panel width; the panel width of each panel extends laterally along the vehicle when the panel is connected to the tonneau, the panel length of the panel being measured perpendicularly to the panel width; at least one panel of the at least two panels other than the first panel comprises at least one anchor fixture connected to a panel body of the at least one panel; each of the at least one anchor fixture defines an anchor aperture configured to at least partially receive therein an anchor connected to an accessory so as to mount the accessory to the at least one panel; the slots of each of the at least two supporting posts are arranged such that, when one of the slots receives therein one of the at least one panel and an adjacent one of the slots receives therein an other panel of the at least two panels, the anchor fixture of the at least one panel: is disposed between the panel body of the at least one panel and the other panel, and is spaced from the other panel.

In some embodiments, each panel of the at least two panels has a panel length and a panel width; the panel width of each panel extends laterally along the vehicle when the panel is connected to the tonneau, the panel length of the panel being measured perpendicularly to the panel width; and the panel lengths of at least two panels of the at least two panels are different from each other.

In some embodiments, a vehicle includes: a frame; a tonneau supported by the frame; and the tonneau cover system.

According to another aspect of the present technology, there is provided a tonneau cover system for a vehicle. The vehicle has a tonneau configured for cargo storage. The tonneau has a tonneau width measured laterally along the vehicle. The system includes: a plurality of panels configured to be selectively connected to the tonneau, the panels being configured to extend laterally relative to a longitudinal axis of the vehicle when the panels are connected to the tonneau, the panels being selectively placed in a cover position whereby the panels extend generally parallel to a floor of the tonneau to at least partly cover the tonneau, each panel of the plurality of panels having a panel body having a width that is dimensioned so as to span at least a majority of the tonneau width when the panel is in the cover position. At least one panel of the plurality of panels includes at least one anchor fixture connected to the panel body of the at least one panel, each of the at least one anchor fixture defining an anchor aperture configured to at least partially receive therein an anchor connected to an accessory so as to mount the accessory to the at least one panel.

In some embodiments, the system also includes a lining configured to be connected to the tonneau, the lining including two side walls that extend generally parallel to the longitudinal axis of the vehicle when the lining is connected to the tonneau, the panels being connected to the tonneau by the lining.

In some embodiments, the panels are selectively placed in a storage position whereby the panels extend generally perpendicular to the floor of the tonneau.

In some embodiments, the system also includes at least two supporting posts configured to be connected to the tonneau, the at least two supporting posts defining a plurality of slots for receiving therein respective ones of the panels.

In some embodiments, the panels are configured such that, when the panels are in the cover position, a joint formed between two adjacent ones of the panels is watertight.

In some embodiments, each panel also includes a sealing member disposed at at least one of a first end and a second end of the panel; and when the panels are in the cover position, the first end of a first panel of the plurality of panels faces the second end of a second panel of the plurality of panels, and the sealing member at the first end of the first panel forms a seal with the sealing member at the second end of the second panel.

In some embodiments, a vehicle includes: a frame; a tonneau supported by the frame; and the tonneau cover system.

For purposes of this application, terms related to spatial orientation when referring to the vehicle orientation such as forwardly, rearwardly, left, and right are as they would normally be understood by a driver of the vehicle sitting thereon in a normal riding position.

Embodiments of the present technology each have at least one of the above-mentioned aspects, but do not necessarily have all of them.

Additional and/or alternative features, aspects, and advantages of embodiments of the present technology will become apparent from the following description, the accompanying drawings, and the appended claims.

DETAILED DESCRIPTION

The present technology will be described in combination with a pickup truck. It is contemplated that the present technology could be used in combination with other vehicles such as sport utility vehicles (SUVs) and cars.

Figure 1:
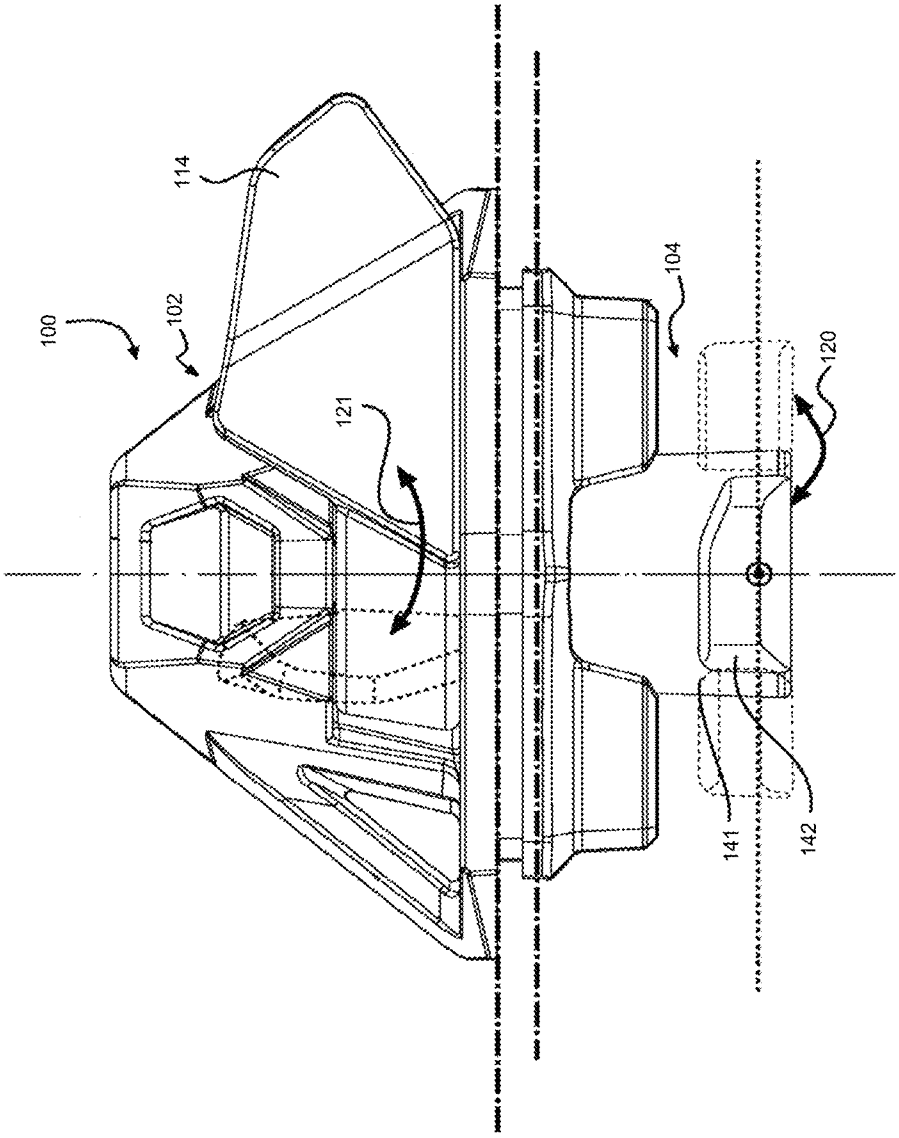
FIG. 1 is a side elevation view of an anchor in a locked position, and in an unlocked position in phantom.

Turning to FIG. 1, the anchor 100 includes a case 102, a lever 114, and a latch 104. The anchor 100 is similar to that found in U.S. Pat. No. 8,777,531 issued on Jul. 15, 2014, the entirety of which is incorporated herein by reference. The latch 104 has a generally cylindrical latch body 141 and a pair of cams 142. The lever 114 is connected to the latch body 141. The case 102 houses part of the latch body 141. The case 102 has an elongated hexagonal footprint. It is contemplated that the footprint of the case 102 may be a different shape. The anchor 100 is adapted to be placed into an aperture shaped to receive the anchor 100, that is to say an aperture with the same shape as the footprint of the case 102. The cams 142 are trapezoidal, in line with each other and extend perpendicularly to the latch 104. By rotating the lever 114, the latch body 141 and cams 142 are rotated, and the cams 142 can be moved between the locked and unlocked positions. The cams 142 are rotated by about ninety degrees between the locked and unlocked positions. The rotations of the lever 114 and cams 142 are shown by arrows 121 and 120, respectively, in FIG. 1.

When in an unlocked position, the cams 142 are oriented such that they extend in the same direction as the elongation of the hexagonal footprint of the case 102. As such, when in the unlocked position, the cams 142 are sized to fit inside a corresponding aperture when the anchor 100 is placed into the aperture. When in the locked position, the cams 142 are oriented such that they extend in a direction generally perpendicular to the elongation of the hexagonal footprint of the case 102 and of the corresponding aperture. In this position, the cams 142 will abut the surface surrounding the aperture inside which the anchor 100 has been placed. Therefore, the anchor 100 is prevented from leaving the aperture and the anchor 100 is fastened.

Figure 2:
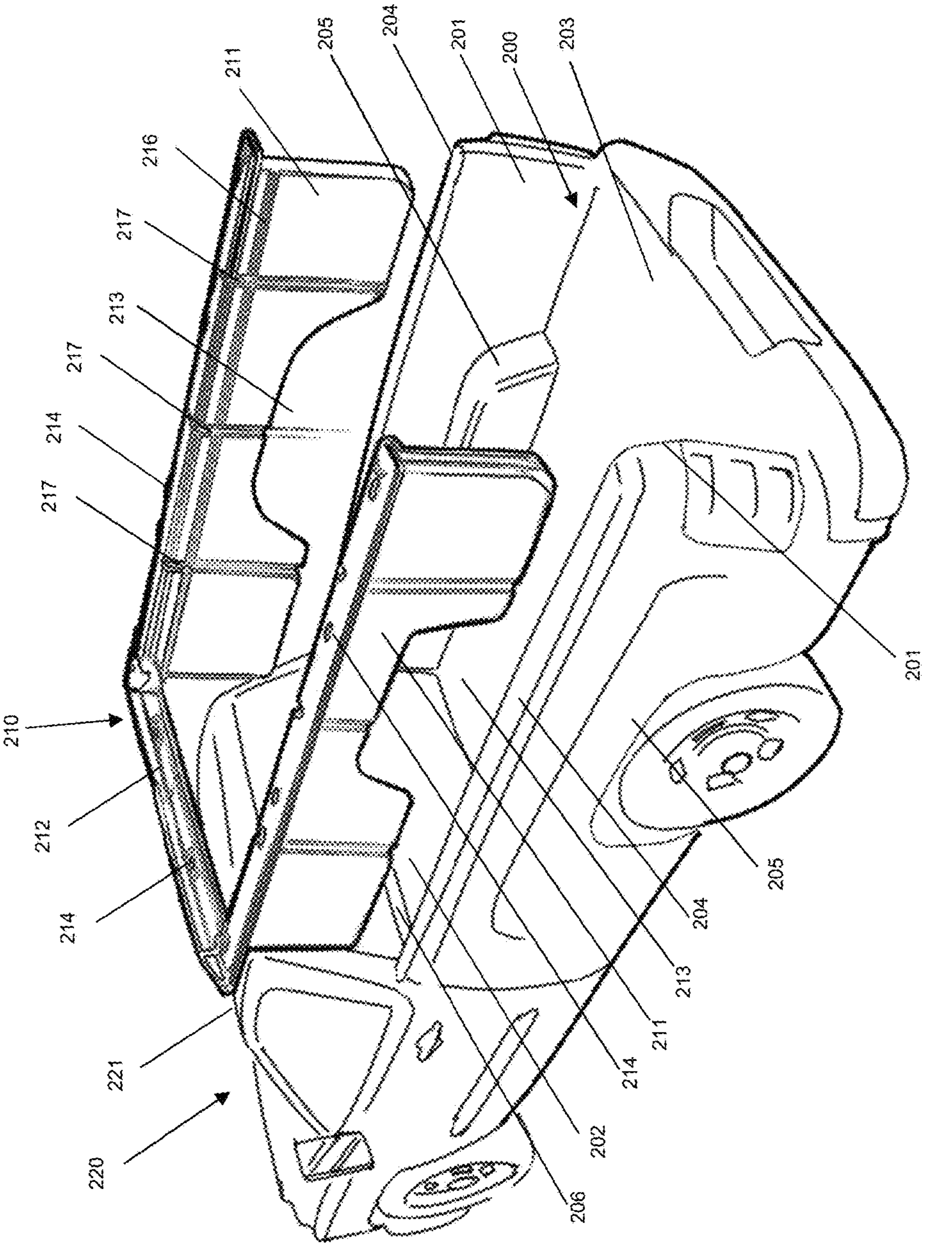
FIG. 2 is a perspective view of a pickup truck with a tonneau lining.
Figure 4:
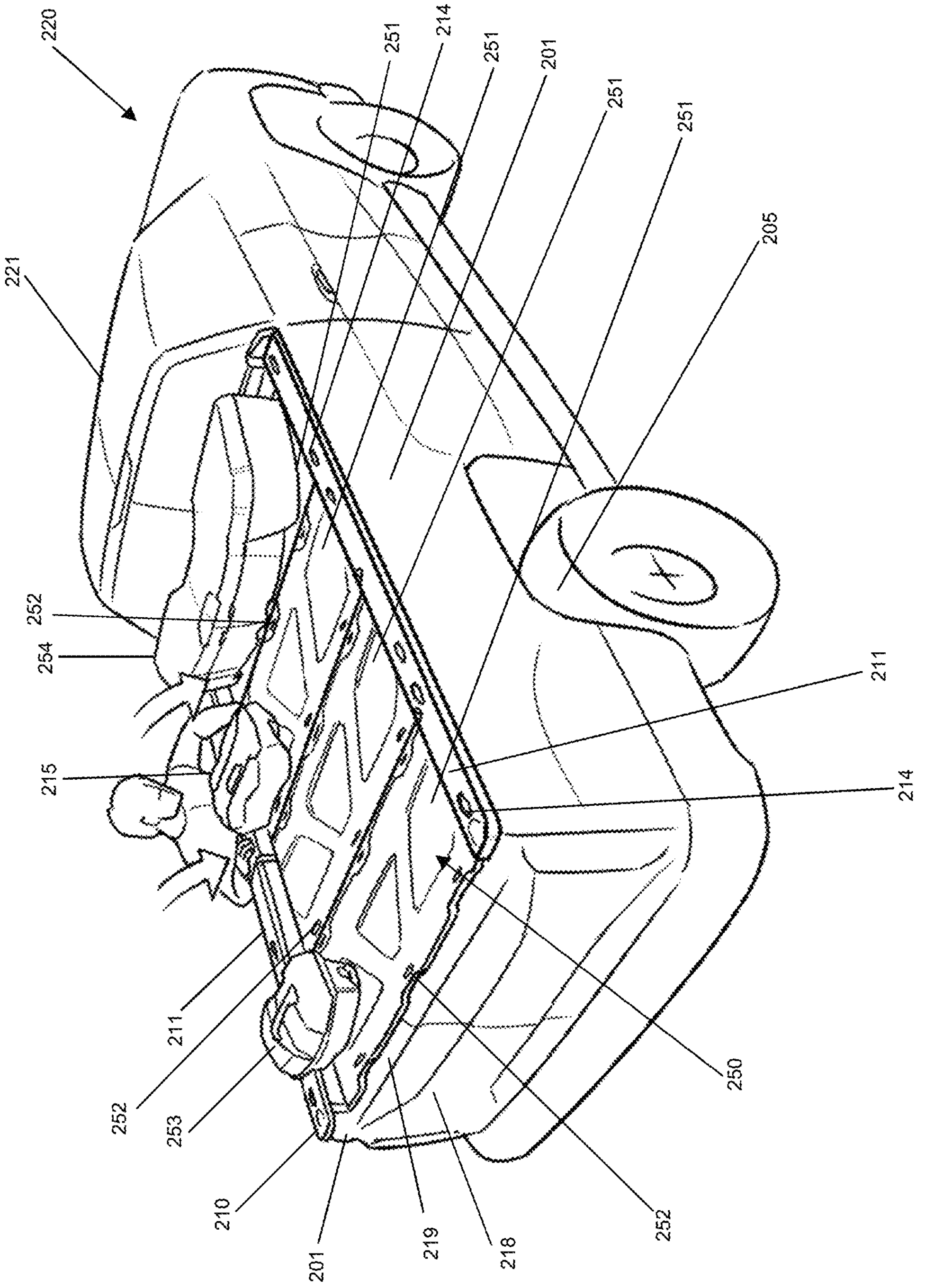
FIG. 4 is a perspective view of a pickup truck with the tonneau lining of FIG. 2 and several panels acting as a tonneau cover.

Turning to FIG. 2, a pickup truck 220 has a tonneau 200 (sometimes also referred to as a “bed”) configured for cargo storage, comprising two side walls 201, a front wall 202, a floor 203 and a tailgate 218 (shown in FIG. 4). Two side wall top edges 204, a front wall top edge 206, and a tailgate top edge 219 (shown in FIG. 4) are created by the thickness of the side walls 201, front wall 202 and tailgate 218, respectively. The pickup truck 220 has wheel wells 205 which protrude from the side walls 201 towards the floor 203. The pickup truck 220 also has a frame (not shown) which supports the tonneau 200.

A lining 210 is placed inside the tonneau 200. The lining 210 has two lining side walls 211 connected by a front bar 212. The lining side walls 211 have an inverted L-shaped profile with recesses 213 to accommodate the shape of the wheel wells 205. When the lining 210 is inserted into the tonneau 200, the lining side walls 211 come into contact with the side walls 201 and side wall top edges 204, and the front bar 212 comes into contact with the front wall top edge 206. When the lining 210 is connected to the tonneau 200, the lining side walls 211 extend generally parallel to the longitudinal axis of the pickup truck 220. The lining side walls 211 each have one horizontal slit 216 and three vertical slits 217. It is contemplated that each lining side wall 211 could have more than one horizontal slit 216. It is also contemplated that each lining side wall 211 could have more or less than three vertical slits 217. It is also contemplated that the lining 210 could have different dimensions to accommodate various makes and models of pickup trucks.

The lining side walls 211 and front bar 212 have several lining apertures 214 which can receive the anchor 100. The lining apertures 214 (only some of which are labeled for clarity) are located at various locations on the lining 210, including along the front bar 212, the horizontal portion of the lining side walls 211, and the bottom of the lining side walls 211. The lining apertures 214 allow for the attachment of various accessories to the lining 210 using the anchor 100 and other similar anchors as will be described below. Accessories may also have a built-in anchor which functions in the same way as the anchor 100 and can be used to attach the accessory to the lining 210.

Figure 3:
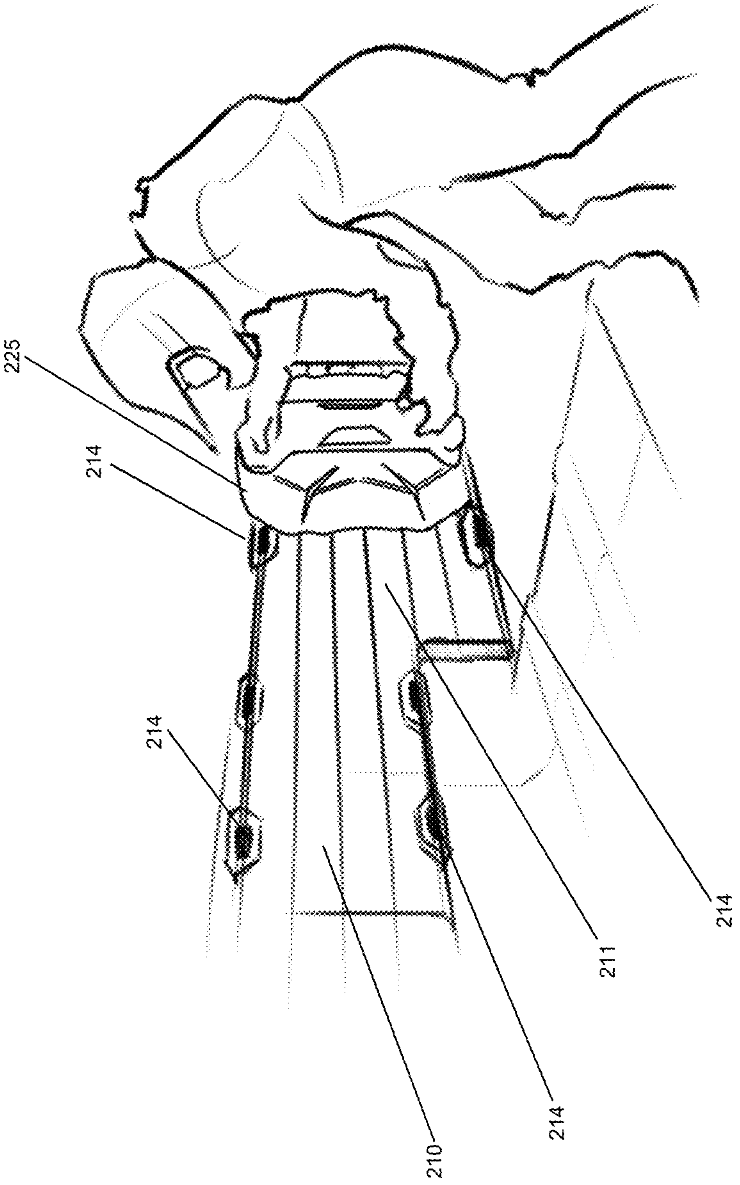
FIG. 3 is a close-up perspective view of a pickup truck with a tonneau lining and attachments.

FIG. 3 shows the attachment of a jerry can 215, similar to that found in U.S. Pat. No. 9,751,592 issued on Sep. 5, 2017, the entirety of which is incorporated herein by reference, to the lining side walls 211. A fire extinguisher 222, depicted in FIG. 10A, can also be attached to the lining side walls 211 using fire extinguisher straps 223 with built-in anchors.

Turning to FIG. 4, in another embodiment, the pickup truck 220 and lining 210 are equipped with a tonneau cover system to form a tonneau cover 250 that covers part or an entirety of the tonneau 200 of the pickup truck 220. The tonneau cover 250 is made up of four panels 251. It is contemplated that the tonneau cover 250 could be made up of more or less than four panels 251. Each panel 251 is rectangular and spans the distance between the lining side walls 211. Each panel 251 has several panel apertures 252 at various locations, including along the edges and the center of the panel 251. These panel apertures 252 allow for the attachment of accessories using anchors 100 and of accessories with built-in anchors of the same type at different locations on the tonneau cover 250. For example, the jerry can 215 is attached to one of the panels 251. A small box 253 and a large box 254, both with built-in anchors, are also attached to panels 251. Each panel 251 is held onto the lining 210 by sliding the panel 251 into the horizontal slits 216 of the lining side walls 211.

Figure 5:
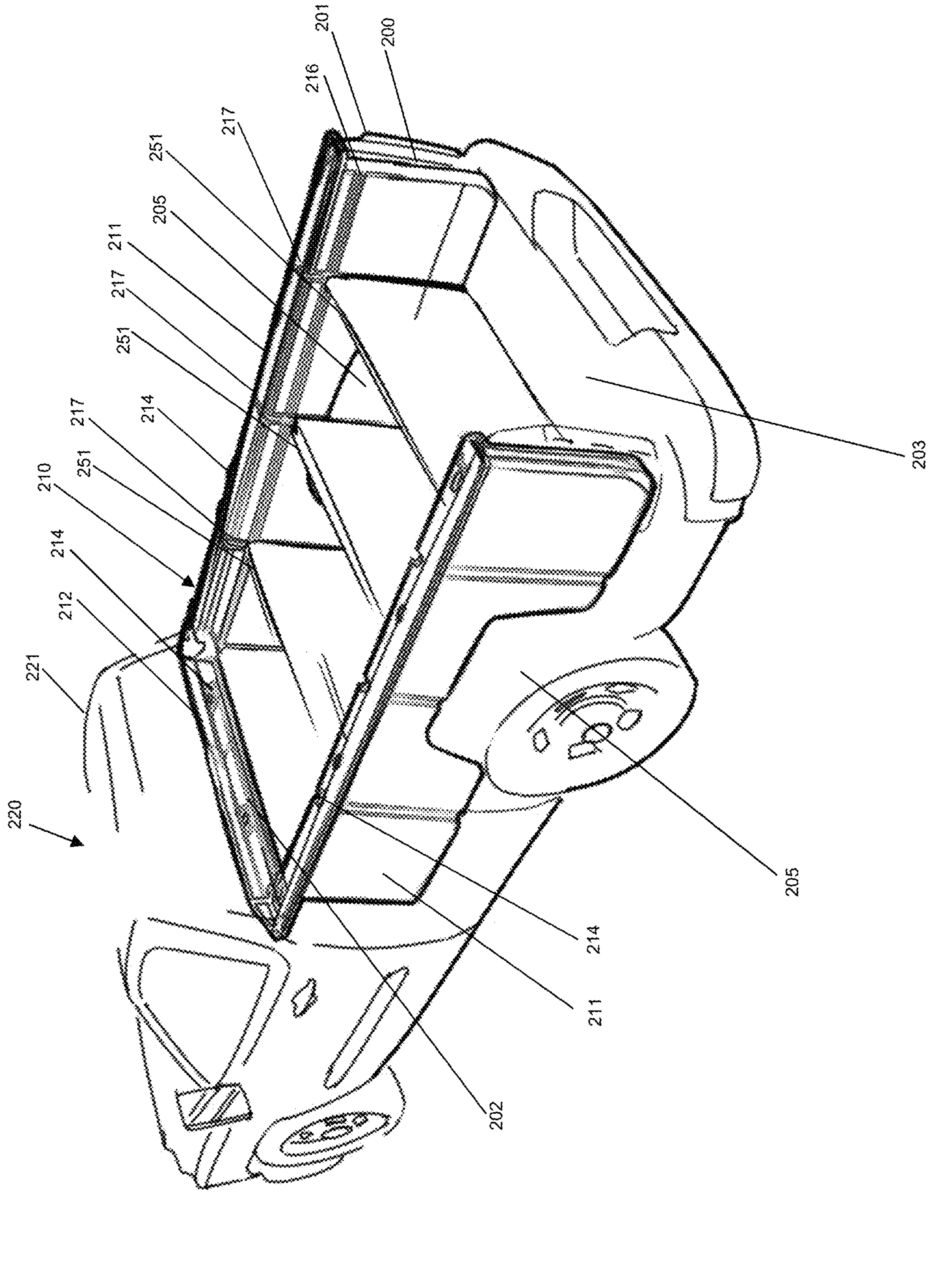
FIG. 5 is a perspective view of the panels of FIG. 4 acting as dividers inside the tonneau of the pickup truck.

As shown in FIG. 5, the panels 251 can also slide vertically into the vertical slits 217 of the lining side wall 211 and act as dividers in the tonneau 200. When the panels 251 are in this position, the panel apertures 252 still allow for accessories to be fastened to the panels 251 using the anchors 100 and built-in anchors of the same type.

The tonneau cover system may be configured differently in other embodiments. For instance, with reference to FIG. 19, the tonneau cover system includes four rectangular panels 451 that are selectively connected to the tonneau 200 by the lining 210. The panels 451 extend laterally relative to a longitudinal axis of the pickup truck 220 when the panels 451 are connected to the tonneau 200. Each panel 451 has a panel body 452 having a width that, when the panel 451 is connected to the tonneau 200, extends laterally along the pickup truck 220, and a length that is measured perpendicularly to the panel width (i.e., longitudinally along the pickup truck 220 when the panel 451 is connected to the tonneau 200 and in a “cover” position as will be described below).

Figure 19:
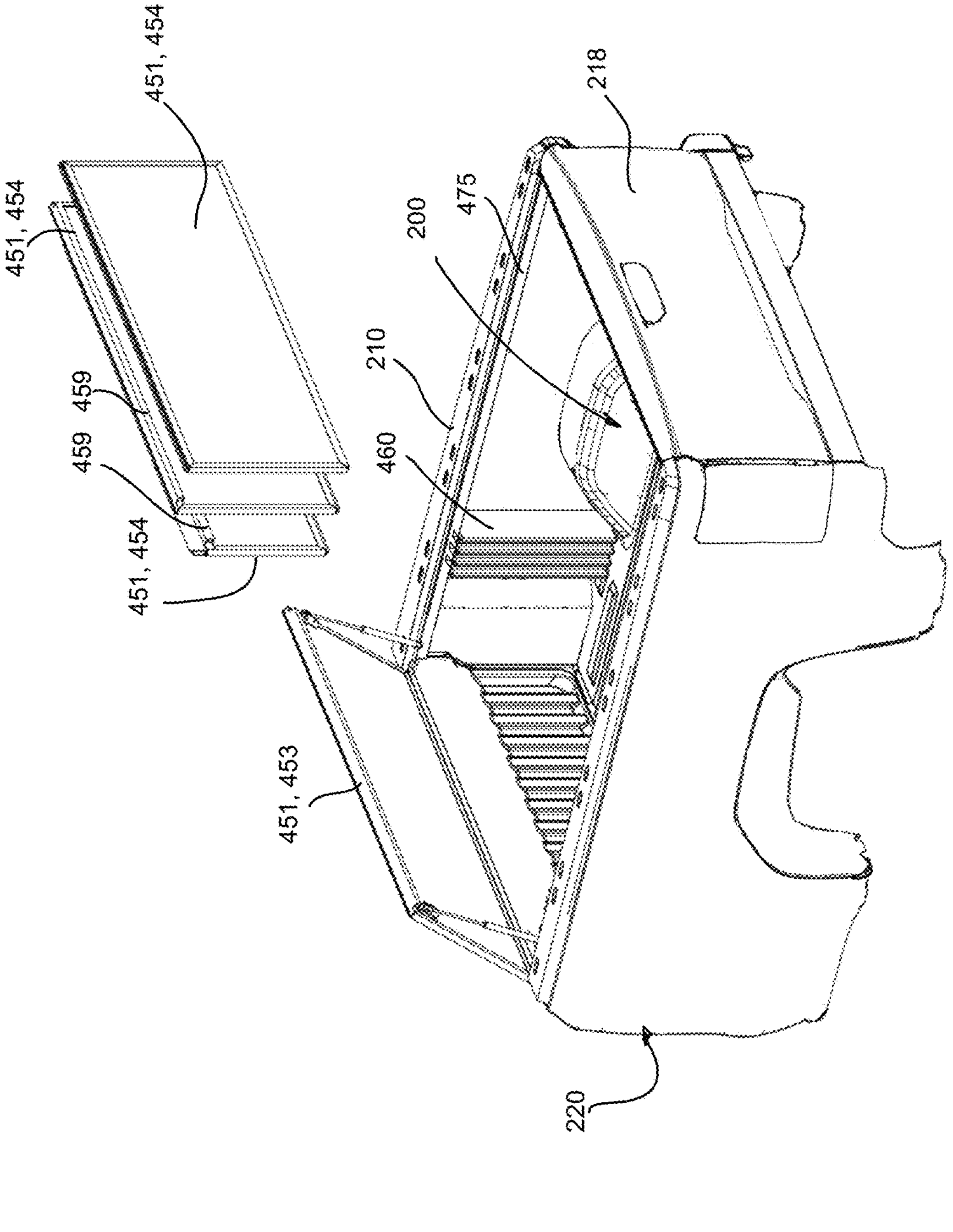
FIG. 19 is a perspective view, taken from the rear, left side, of the tonneau of the pickup truck of FIG. 1, shown with a tonneau cover system including a plurality of removable panels in an exploded configuration.
Figure 20:
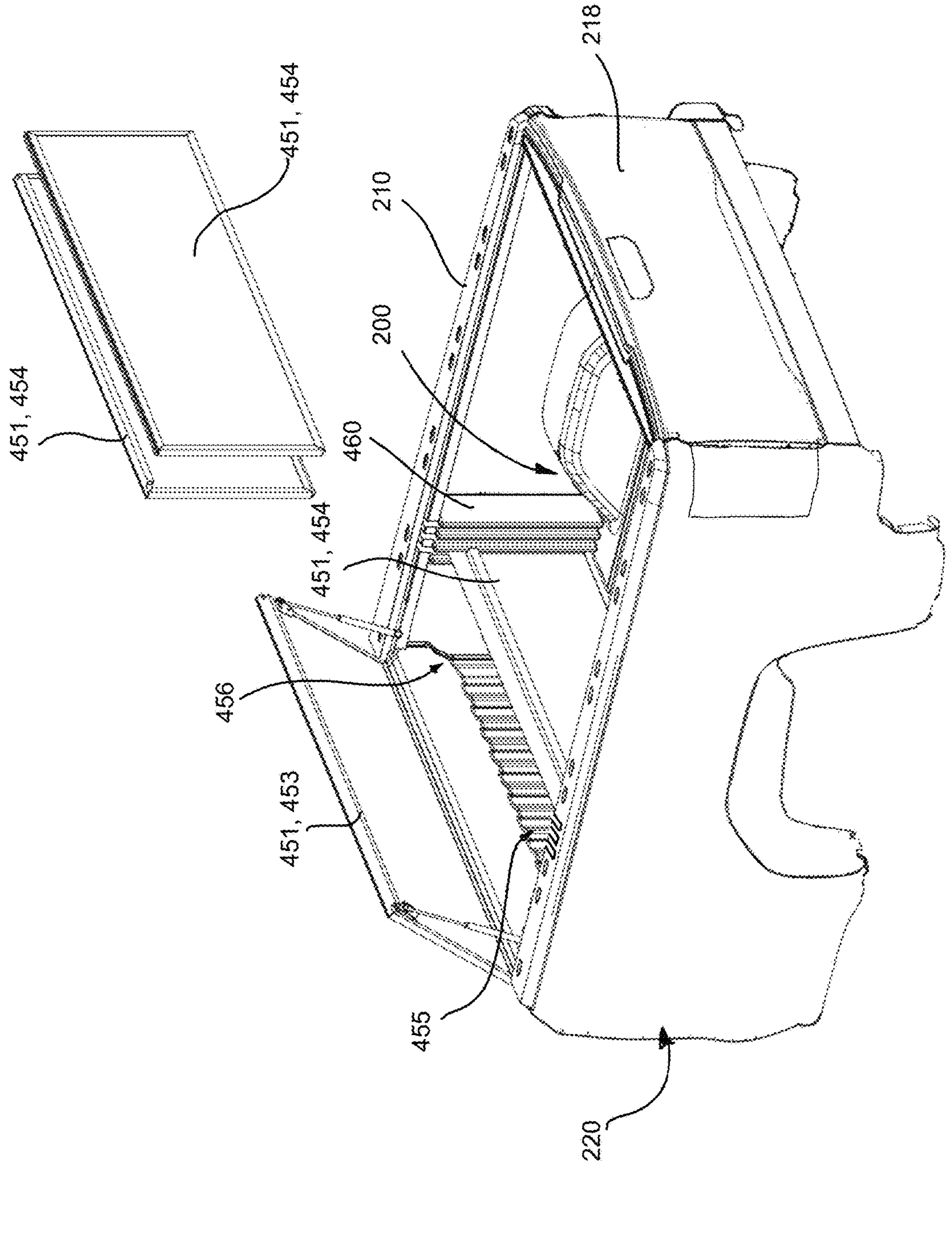
FIG. 20 is a perspective view, taken from the rear, left side, of the tonneau of the pickup truck of FIG. 19, shown with one of the removable panels in a storage position.

The width of each panel 451 is greater than the length thereof. The width of each panel 451 is dimensioned so as to span at least a majority (i.e., a majority or an entirety) of the width of the tonneau 200. As can be seen in FIG. 19, the panel lengths of the panels 451 are different from each other. Each panel 451 has an inner protrusion 459 (see FIG. 29) protruding from an inner face of the panel body 452 to limit lateral movement of the panel 451 relative to the tonneau 200. In some embodiments, the protrusion 459 has a panel retention mechanism therein for retaining the panel 451 onto the tonneau 200 when in the cover position. The panel retention mechanism could be a pair of spring-loaded pins that extend under the inner ledge 475 of the lining side walls 211 of the lining 210 when the panel 451 is in the cover position for example.

Figure 37:
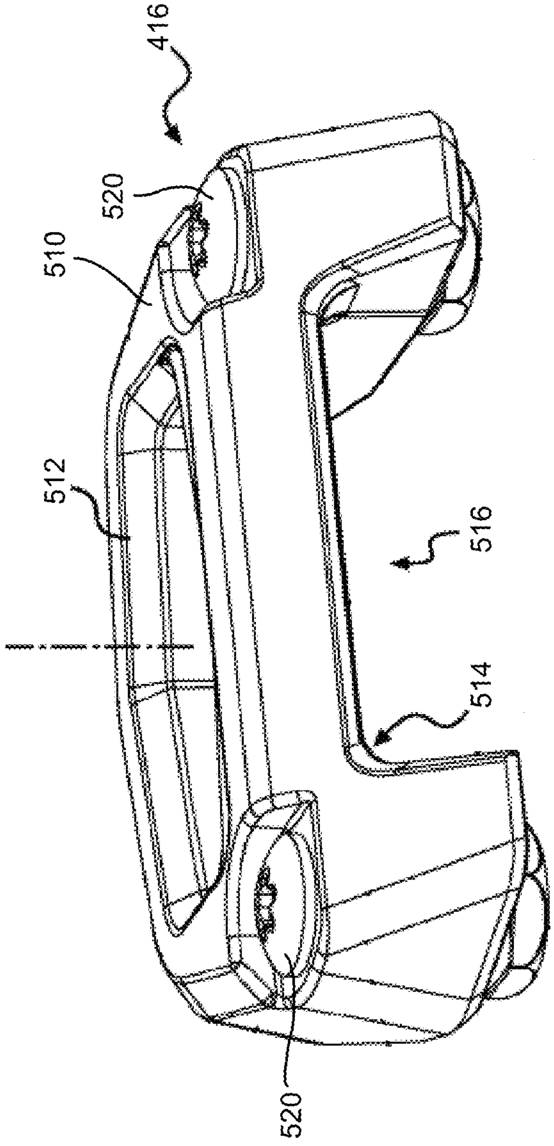
FIG. 37 is a perspective view of an anchor fixture.
Figure 38:
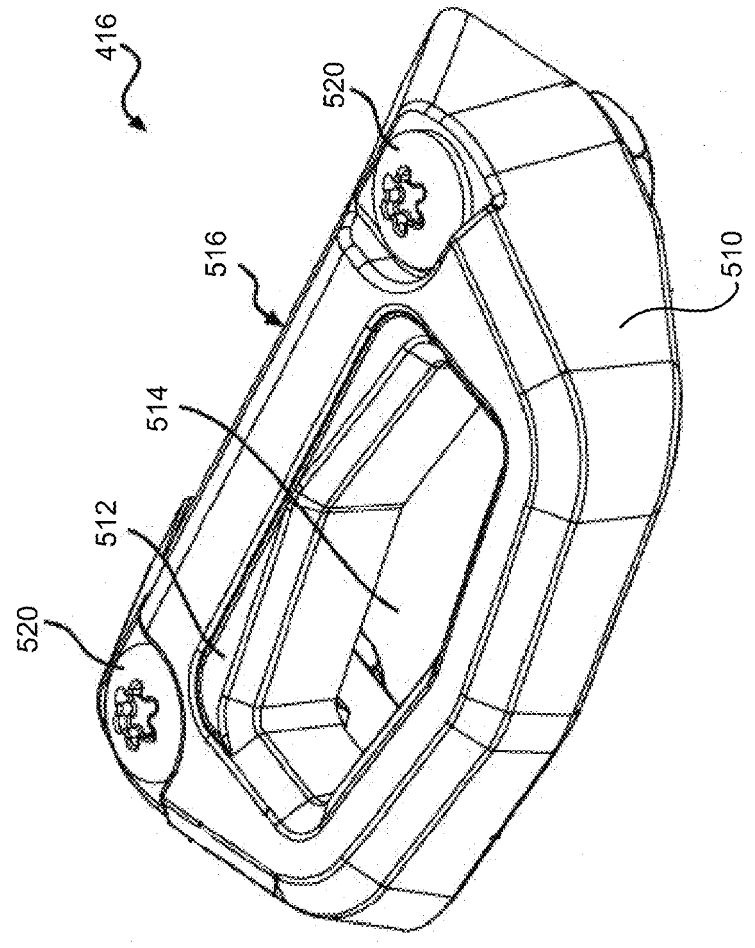
FIG. 38 is another perspective view of the anchor fixture of FIG. 37.

In this embodiment, some of the panels 451 include anchor fixtures 416, such as those described in U.S. Pat. No. 9,751,592, attached to the respective panel bodies 452 of the panels 451. As shown in FIGS. 37 and 38, each anchor fixture 416 has a fixture body 510 defining an anchor aperture 512 at its top portion for receiving the cams 142 of the anchor 100 so as to mount the accessory (to which the anchor 100 is connected) to the respective panel 451. The anchor aperture 512 opens into an anchor chamber 514 for receiving the cams 142 of the anchor 100 therein. At its front portion, the fixture body 510 defines a fastener aperture 516 for receiving a tongue fastener therein, such as the tongue fastener of the accessory base described in U.S. Pat. No. 9,751,592. The anchor fixtures 416 are fastened to a respective panel body 452 by two fasteners 520.

Figure 22:
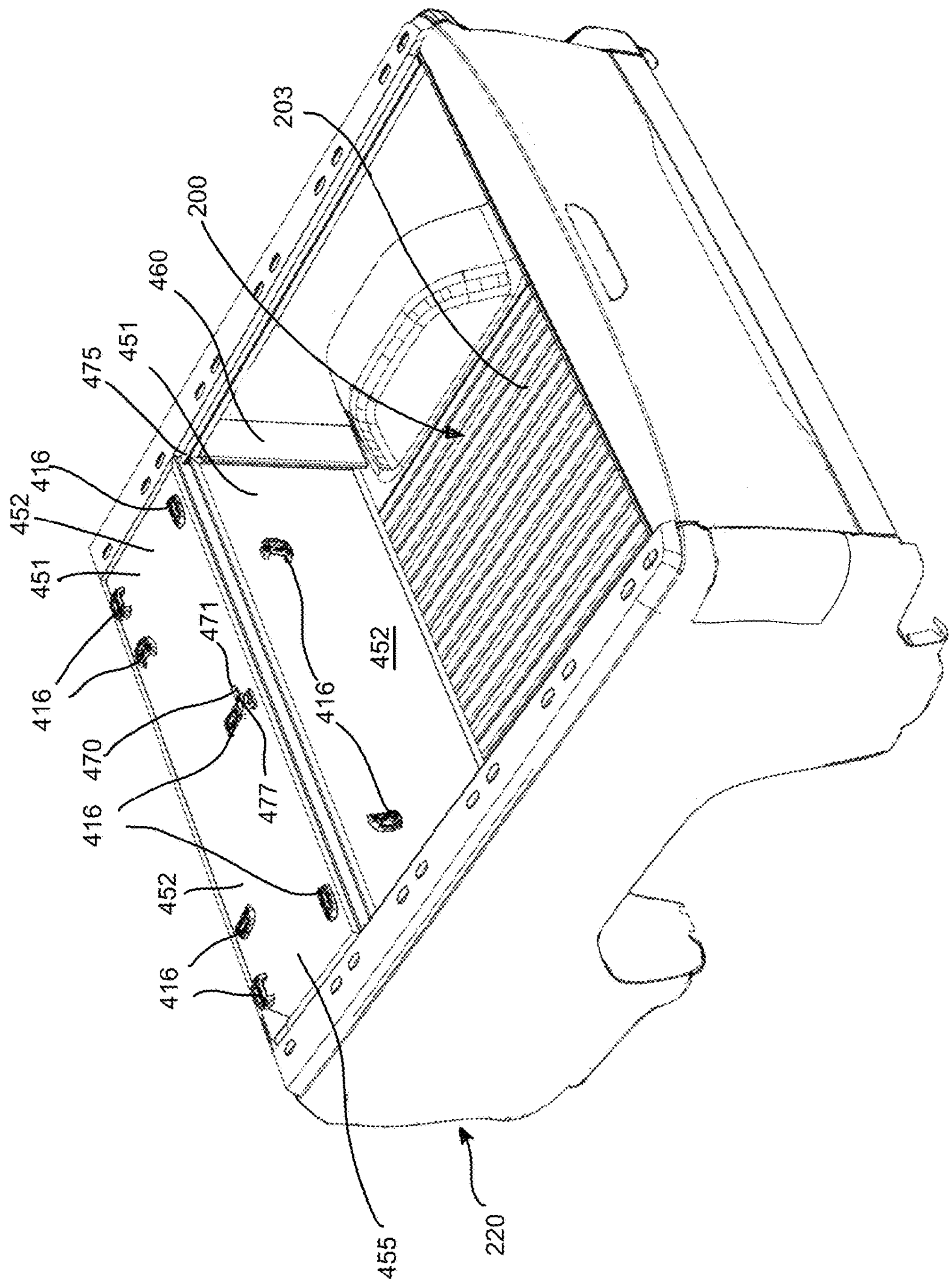
FIG. 22 is a perspective view, taken from the rear, left side, of the tonneau of the pickup truck of FIG. 21, shown with a pivotable panel of the tonneau cover system in a closed position and collaboratively forming a container with another panel.
Figure 26:
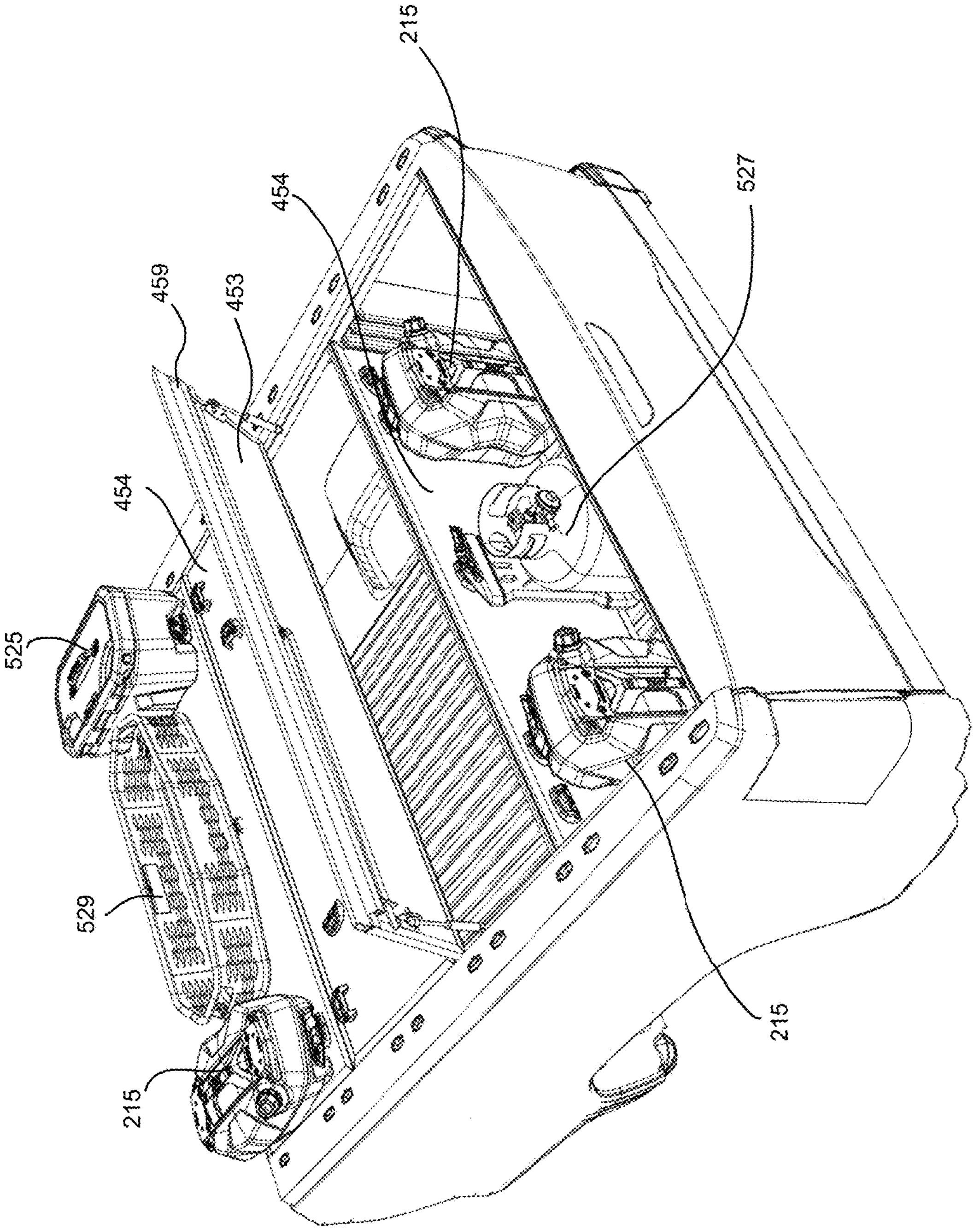
FIG. 26 is a perspective view, taken from the rear, left side, of the tonneau of the pickup truck of FIG. 25, shown with the pivotable panel in an open position.
Figure 27:
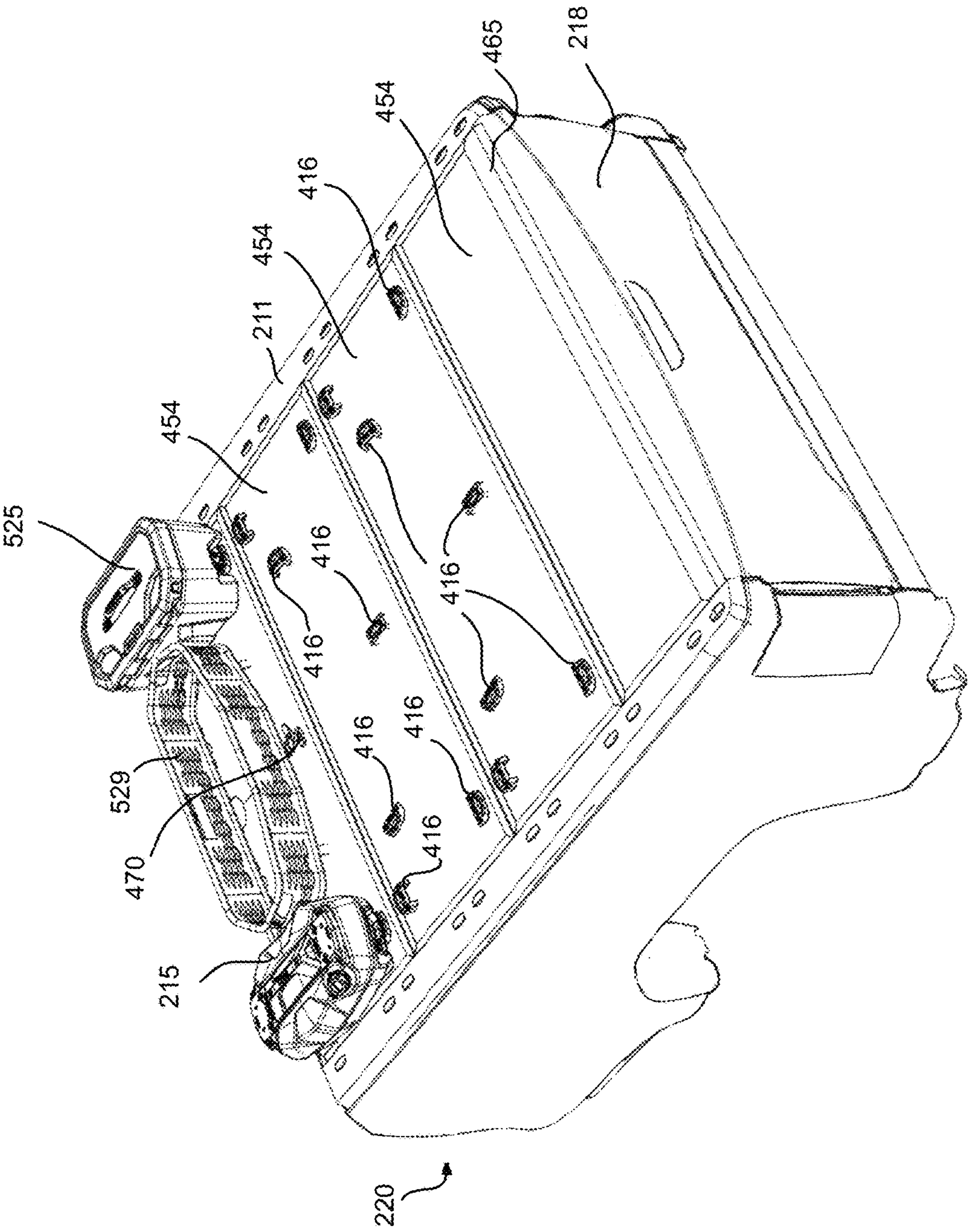
FIG. 27 is a perspective view, taken from the rear, left side, of the tonneau of the pickup truck of FIG. 19, shown with the pivotable panel in a closed position and the removable panels in the cover position.

One of the panels 451, which will be referred to herein as the pivotable panel 453, is hingedly connected to the tonneau 200 while the three other panels 451, which will be referred to herein as the removable panels 454, are selectively placed in the cover position or a "storage" position. The pivotable panel 453 is hingedly connected to the lining 210 so as to be pivotable between an open position (FIG. 19) and a closed position (FIG. 22). In the closed position, the pivotable panel 453 extends generally parallel to the floor 203 of the tonneau 200 and is supported by the inner ledge 475 of the lining side walls 211 of the lining 210. As can be seen, in this example, the pivotable panel 453 is selectively connected to the tonneau 200 so as to be, amongst the panels 451, closest to a front end of the tonneau 200. The pivotable panel 453 may also be selectively connected to the tonneau 200 so as to be closer to a rear end of the tonneau than to the front end of the tonneau, as shown in FIG. 26. In fact, the pivotable panel 453 is configured to be selectively connected to the tonneau 200 at any one of a plurality of locations along the tonneau 200.

Figure 28:
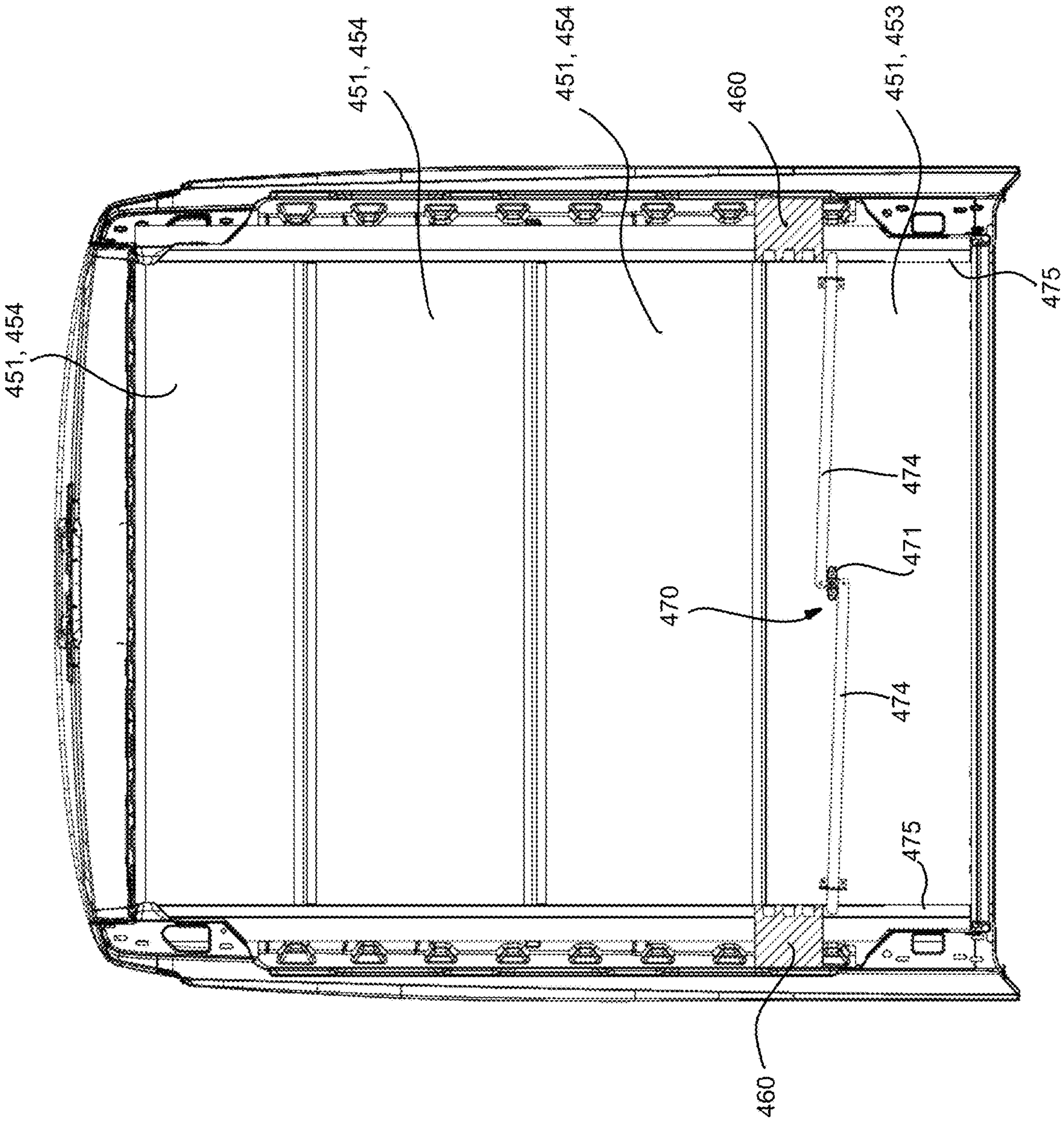
FIG. 28 is a cross-sectional view of the tonneau of the pickup truck of FIG. 27, shown with the pivotable panel in the closed position and the removable panels in the storage position.

As shown in FIG. 22, the pivotable panel 453 also includes a locking device 470 connected to the panel body 452 thereof for securing the pivotable panel 453 in the closed position. The locking device 470 includes a handle 471 that is rotatable by a user to selectively lock or unlock the pivotable panel 453. As shown in FIG. 28, the locking device 470 also includes two rods 474 operatively connected to the handle 471 and extending laterally in opposite directions. When the locking device 470 is locked, the distal ends of the two rods 474 are disposed beneath a ledge 475 of the lining side walls 211, thereby preventing the pivotable panel 453 from being pivoted upward from the closed position to the open position. When the user rotates the handle 471 to an unlocked position, the rods 474 are retracted laterally inwardly such that the distal ends of the rods 474 are disposed laterally inwardly of the respective ledges 475 such that the pivotable panel 453 can be pivoted upwardly to the open position. The locking device 470 has a key hole 477 (FIG. 22) in which a key is inserted to allow the user to rotate the handle 471.

As can be seen in FIG. 19, the removable panels 454 have different panel lengths as defined by their panel bodies 452. In the storage position, the removable panels 454 extend generally perpendicular to the pivotable panel 453 when the pivotable panel 453 is in the closed position. Notably, in the storage position, the removable panels 454 extend vertically and are received by two supporting posts 460 that are laterally aligned with one another. Each supporting post 460 is connected to one of the side walls 211. The supporting posts 460 are longitudinally aligned in pairs so that each pair of supporting posts 460 receives the removable panels 454.

Figure 31:
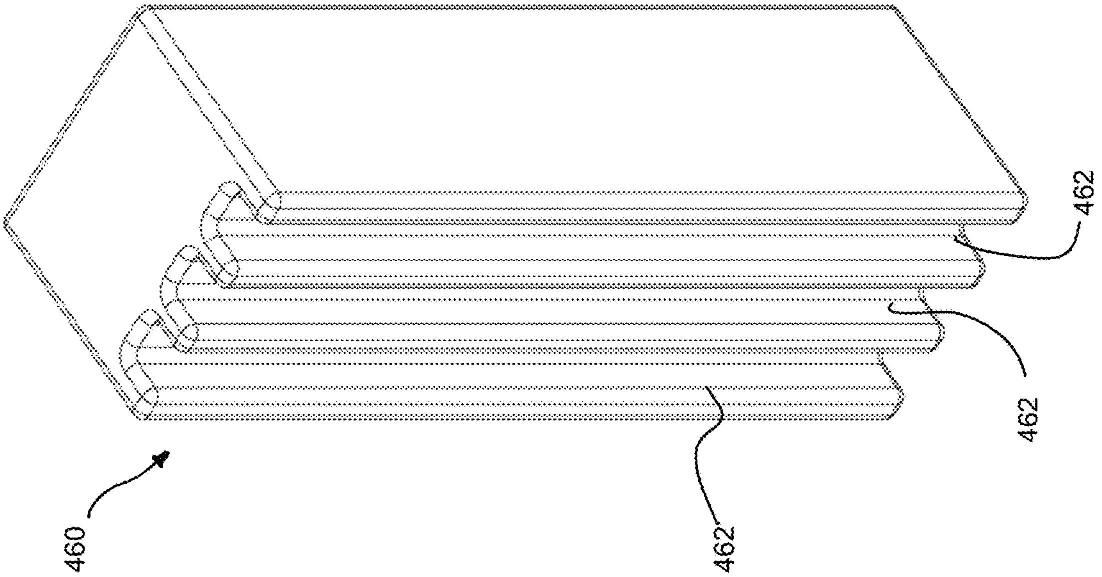
FIG. 31 is a perspective view of a supporting post of the tonneau system of FIG. 19.

As can be seen in FIG. 31, each supporting post 460 defines three vertically-extending slots 462 which receive therein respective ones of the removable panels 454. The slots 462 of each supporting post 460 are arranged to afford sufficient space between the panels 464 that are supported by the supporting post 460. In particular, the slots 462 are arranged such that, when one of the slots 462 receives therein a first one of the panels 454 that includes an anchor fixture 416, and an adjacent slot 462 receives another one of the panels 454, the anchor fixture 416, which is disposed between the panel body 452 of the first one of the panels 454 and the adjacent panel 454, is spaced from the adjacent panel 454.

Figure 25:
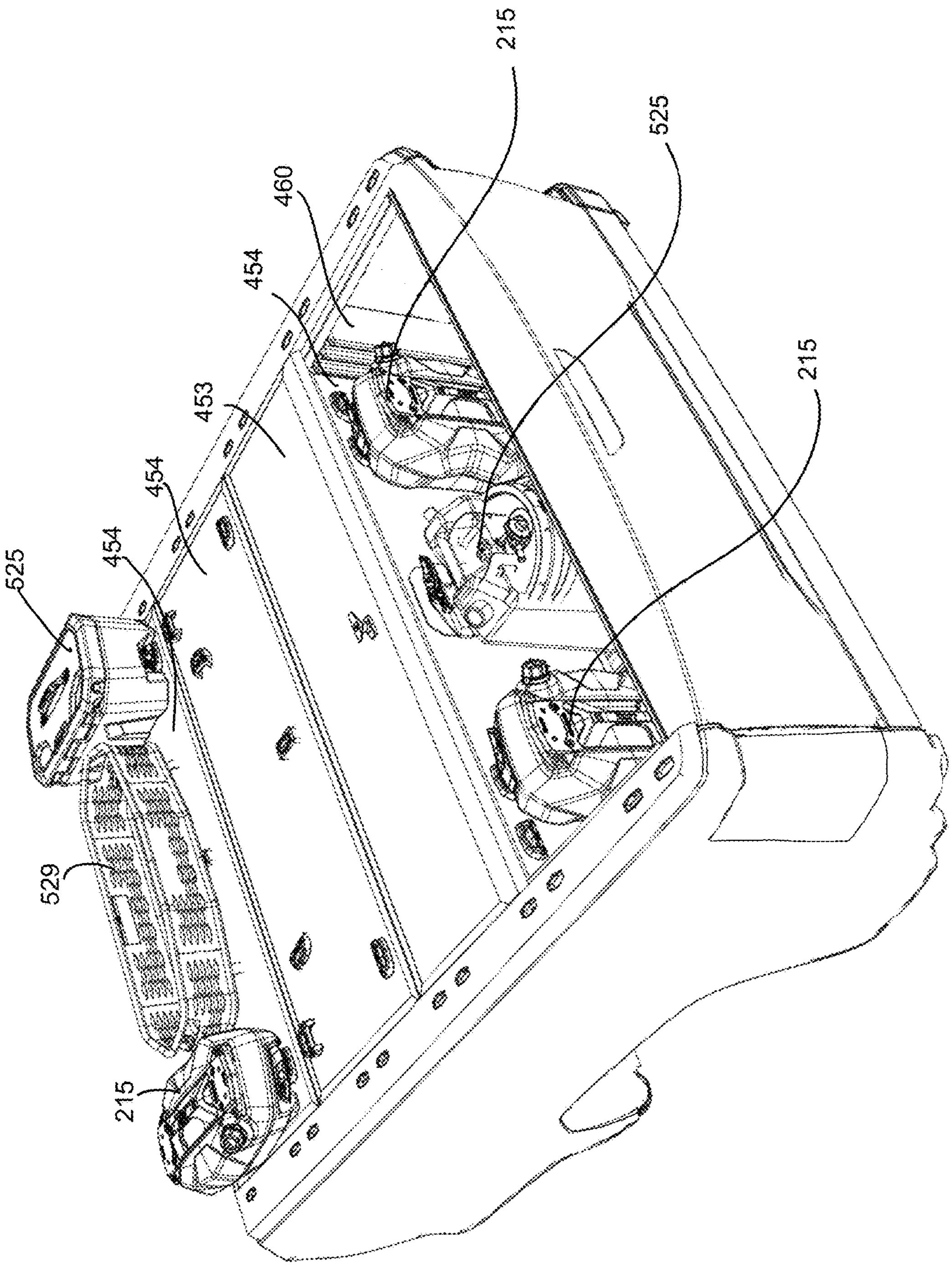
FIG. 25 is a perspective view, taken from the rear, left side, of the tonneau of the pickup truck of FIG. 24, shown with various accessories mounted to the outside of the container formed by the panels.

In the cover position, the removable panels 454 are supported by the ledges 475 and extend generally parallel to the floor 203 of the tonneau 200 to collaboratively cover at least part of the tonneau 200 with the pivotable panel 453 in the closed position. Notably, as can be seen in FIG. 25, the tonneau 200 can be entirely covered by the panels 451 when the removable panels 454 are in the cover position and the pivotable panel 453 is in the closed position. Moreover, as can be seen, the length of the rearmost panel 451 is smaller than the panel lengths of the three other panels 451. In this embodiment, the rearmost panel 451 has a flap 465 at its rear end which is in contact with the tailgate 218 when the rearmost panel 451 is in the cover position. As the lengths of the panels 451 are different, in their respective cover positions, they cover a different length of the tonneau 200.

Figure 29:
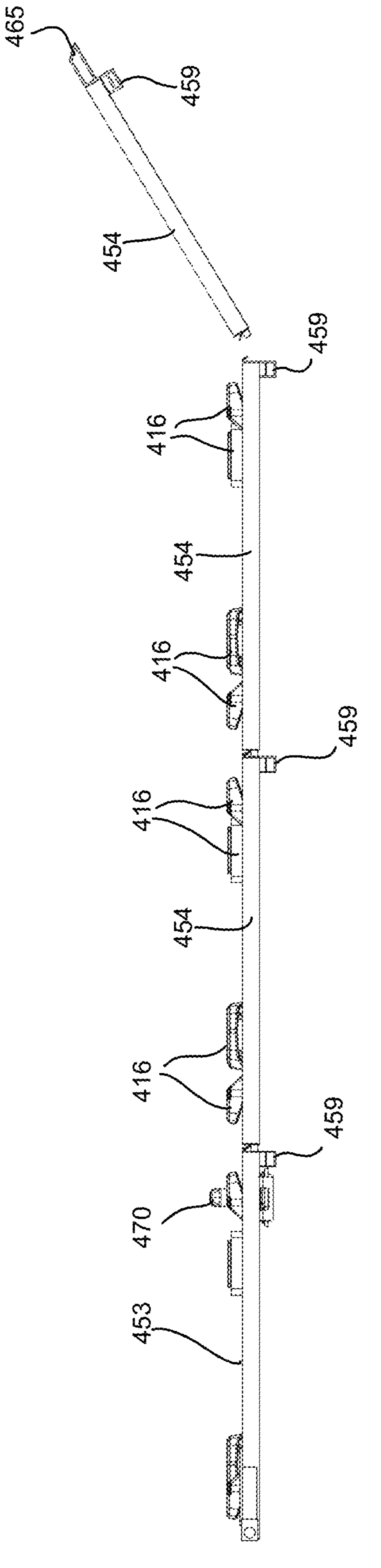
FIG. 29 is a left side elevation view of the panels of the tonneau system of FIG. 27, with a rearmost panel being shown in the process of being placed in the cover position.
Figure 30:
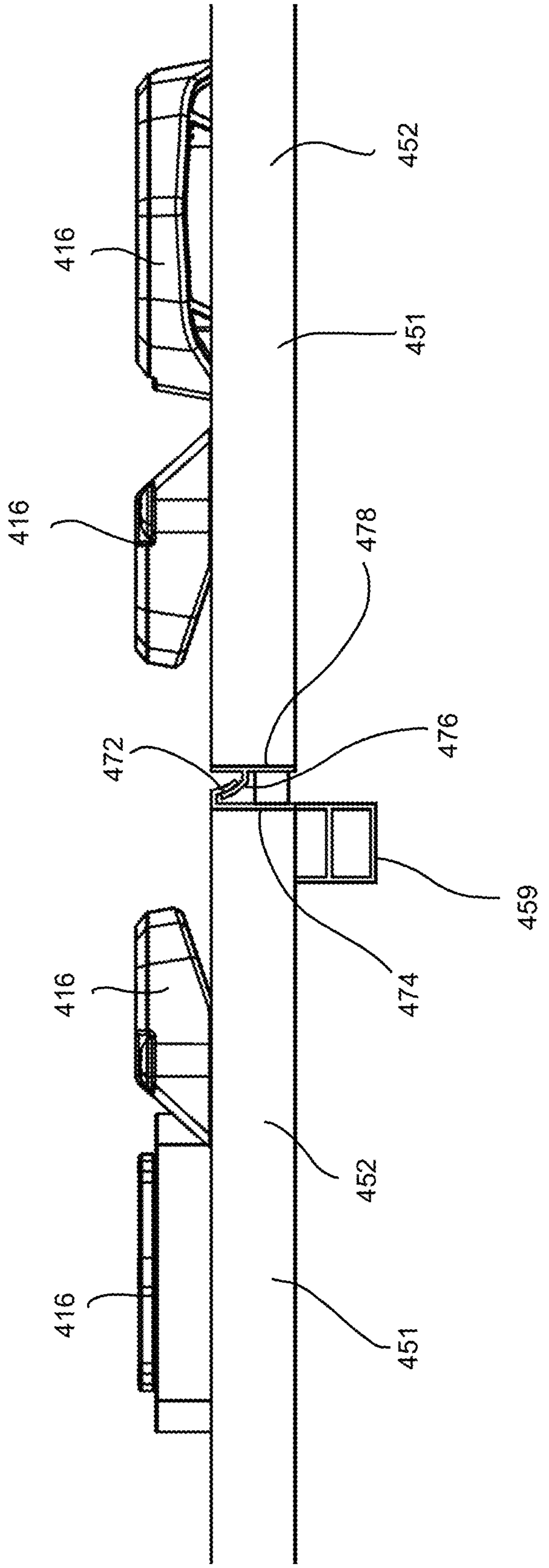
FIG. 30 is a left side elevation view of two adjacent ones of the panels of the tonneau system of FIG. 29.

FIG. 29 shows the pivotable panel 453 in the closed position and two of the removable panels 454 in the cover position, while a third one of the removable panels 454 (the one having the smallest length) is in the process of being placed in the cover position. As can be seen in FIG. 30, when two adjacent panels 451 are in the cover position (for purposes of the pivotable panel 453, its closed position can be considered equivalent to the cover position of the removable panels 454), a watertight joint is formed between the two adjacent panels 451. Notably, in this embodiment, each panel 451 has a front sealing member 472 at a front end 474 thereof (i.e., the end of the panel 451 that faces forward in the cover position) and a rear sealing member 476 at a rear end 478 thereof (i.e., the end of the panel 451 that faces rearward in the cover position). As such, in their cover positions, the front sealing member 472 at the front end 474 of one of the panels 451 forms a seal with the rear sealing member 476 at the rear end 478 of an adjacent panel 451 (the front and rear ends 474, 478 of the two adjacent panels 451 facing one another).

Figure 21:
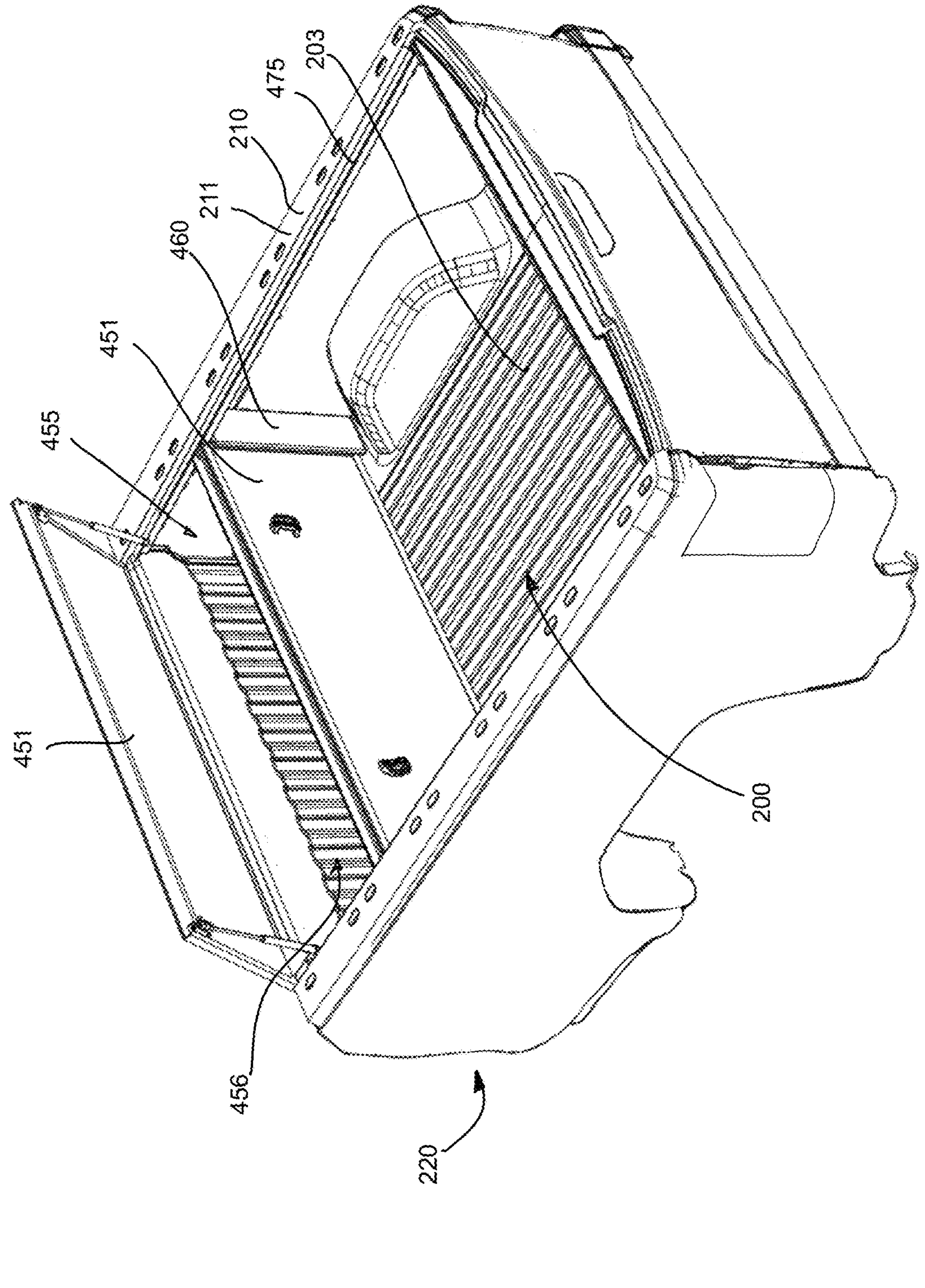
FIG. 21 is a perspective view, taken from the rear, left side, of the tonneau of the pickup truck of FIG. 19, shown with all of the removable panels in the storage position.

As shown in in FIGS. 21 and 22, the panels 451 can collaboratively form a container 455 defining an interior space 456 in which items can be stored without having to entirely cover the tonneau 200. Notably, a user can open and close the pivotable panel 453 to selectively gain access to the interior space 456 defined by the container 455. In this example of implementation, the container 455 is formed by the pivotable panel 453 being in the closed position and one of the removable panels 454 being in the storage position, supported by the two supporting posts 460 that are closest to the pivotable panel 453. In particular, in the embodiment depicted in FIGS. 21 and 22, the container 455 is formed by the pivotable panel 453 and the outermost of the panels 451 supported by the supporting posts 460 (i.e., the panel 454 that is furthest from the front end of the tonneau 200) in the storage position. The remaining removable panels 454 are in the storage position received by corresponding slots 462 of the supporting posts 460, disposed inside the container 455. As can be seen, the outer surfaces of the container 455 are thus formed by two of the panels 451, namely the pivotable panel 453 and the outermost of the removable panels 454. This provides a relative compact container 455 having the length of the pivotable panel 453 and extending about a quarter of the length of the tonneau 200, thereby still leaving considerable space in the tonneau 200 for cargo to be stored outside of the container 455.

Figure 23:
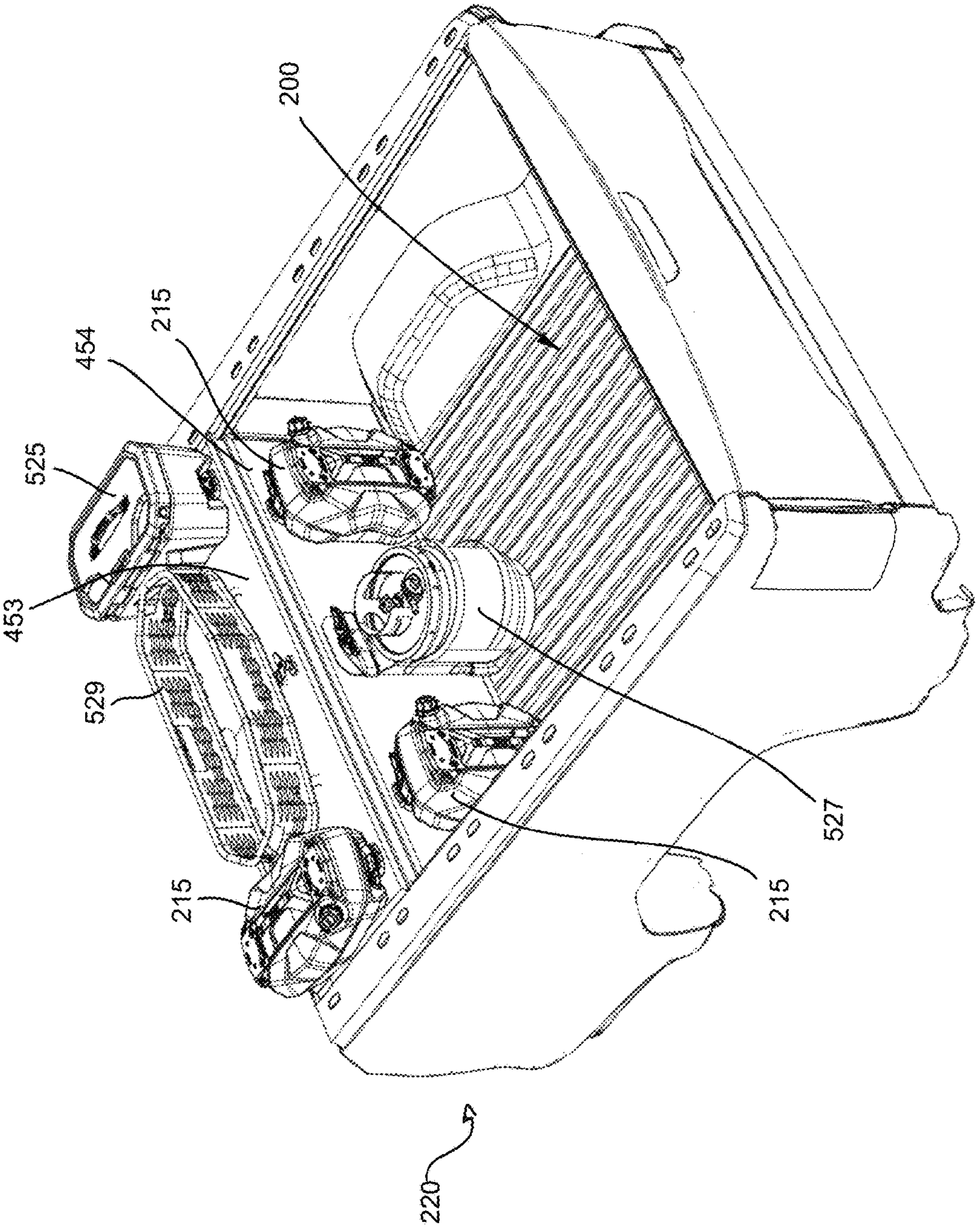
FIG. 23 is a perspective view, taken from the rear, left side, of the tonneau of the pickup truck of FIG. 22, shown with various accessories connected to the container by anchors and anchor fixtures.
Figure 24:
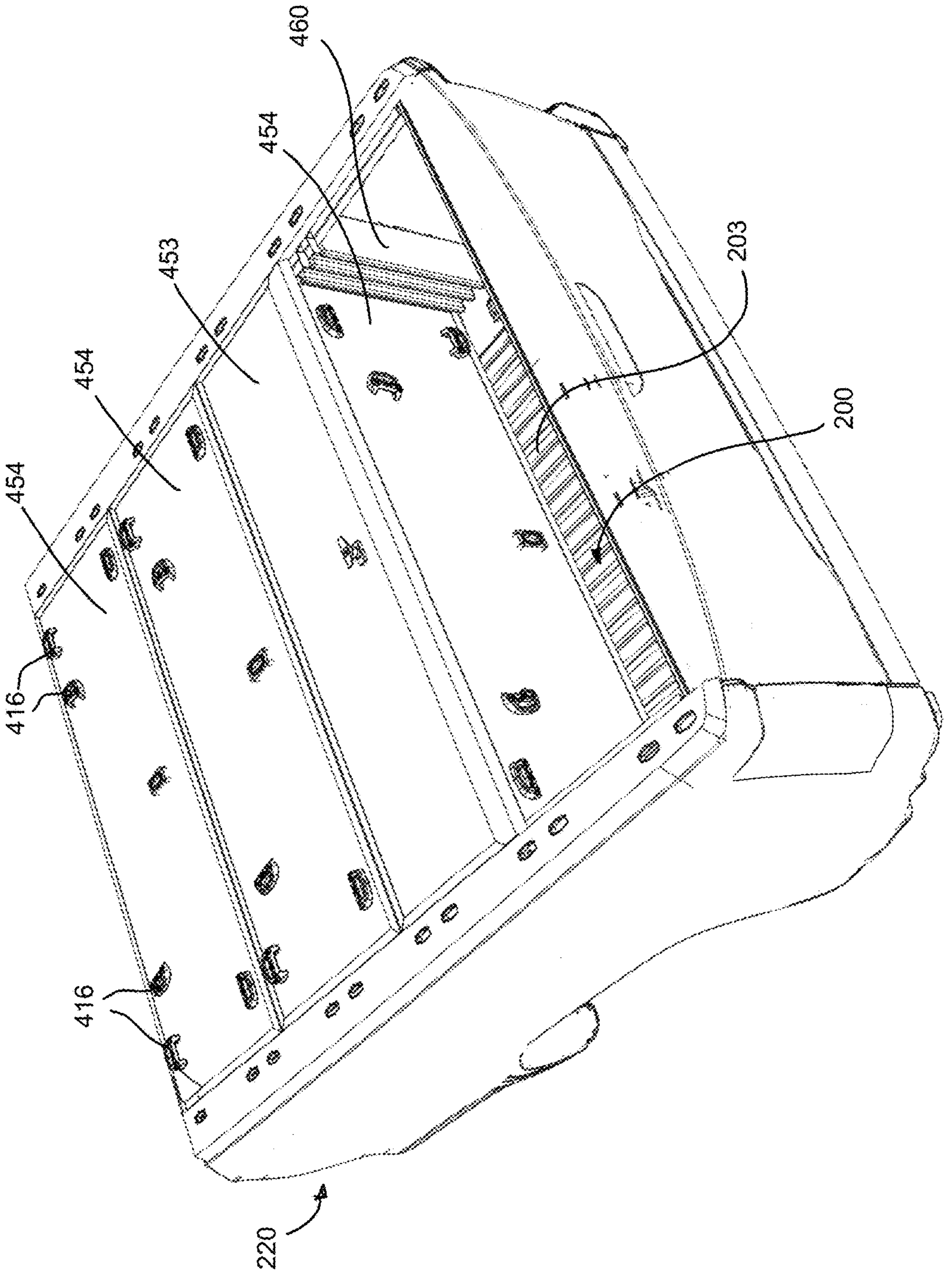
FIG. 24 is a perspective view, taken from the rear, left side, of the tonneau of the pickup truck of FIG. 19, shown with the pivotable panel mounted at a different location.

The container 455 may be made bigger by using additional removable panels 454 in the cover position. For instance, as shown in FIGS. 24 to 26, the container 455 is collaboratively formed by two of the removable panels 454 in the cover position, one of the removable panels 454 in the storage position, and the pivotable panel 453 in the closed position. The container 455 is thus bigger than that depicted in FIGS. 21 to 23 since the length of the container 455 is the sum of the lengths of three panels 451, including the two removable panels 454 and the pivotable panel 453.

As can be seen in FIGS. 23 and 25 to 27, various accessories such as jerry cans 215, storage containers 525, gas tanks 527 and storage racks 529 can be secured to the panels 451 via the anchors 100 and anchor fixtures 416 connected thereto. Moreover, these accessories can be connected to the removable panels 454 both in their cover positions and their storage positions thereby allowing a greater versatility for positioning the accessories in the tonneau 200, as shown in FIG. 25.

Figure 32:
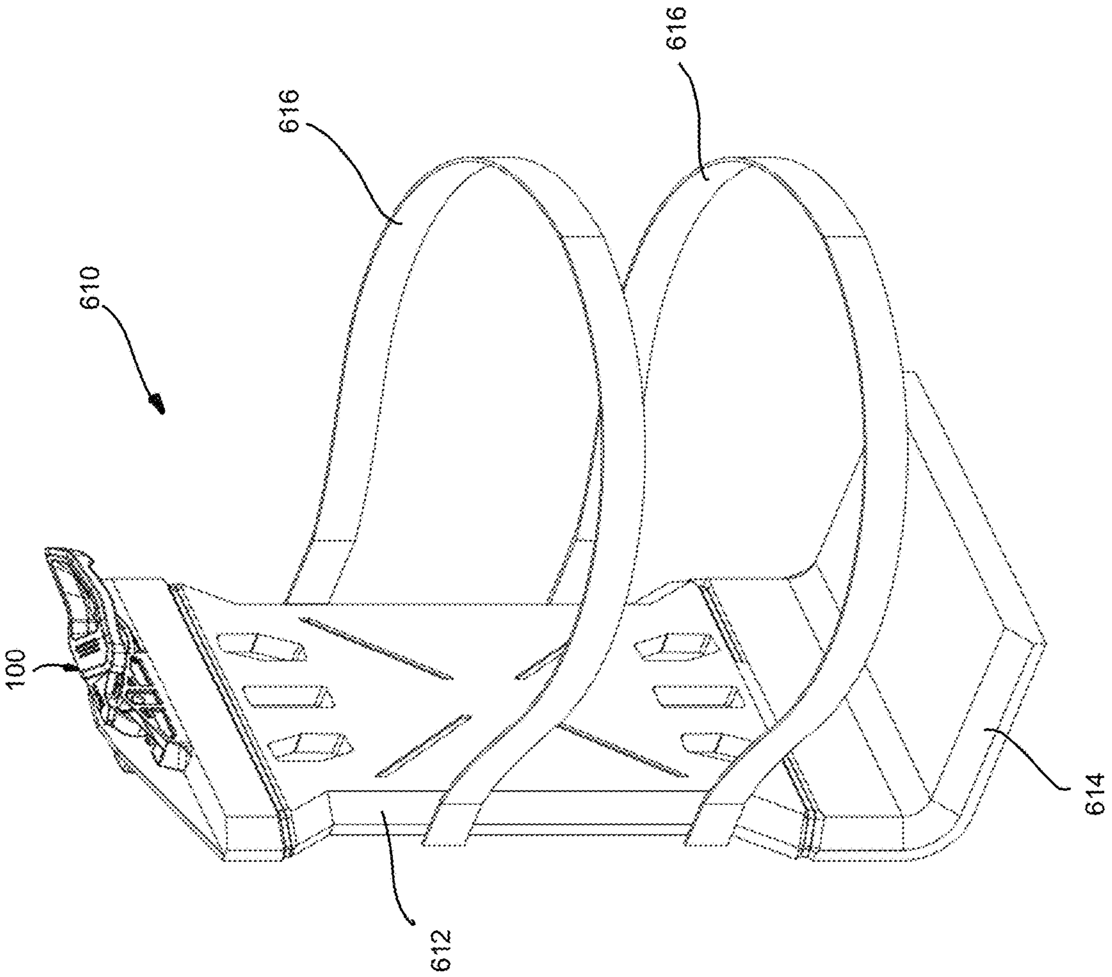
FIG. 32 is a perspective view of an accessory holder.
Figure 33:
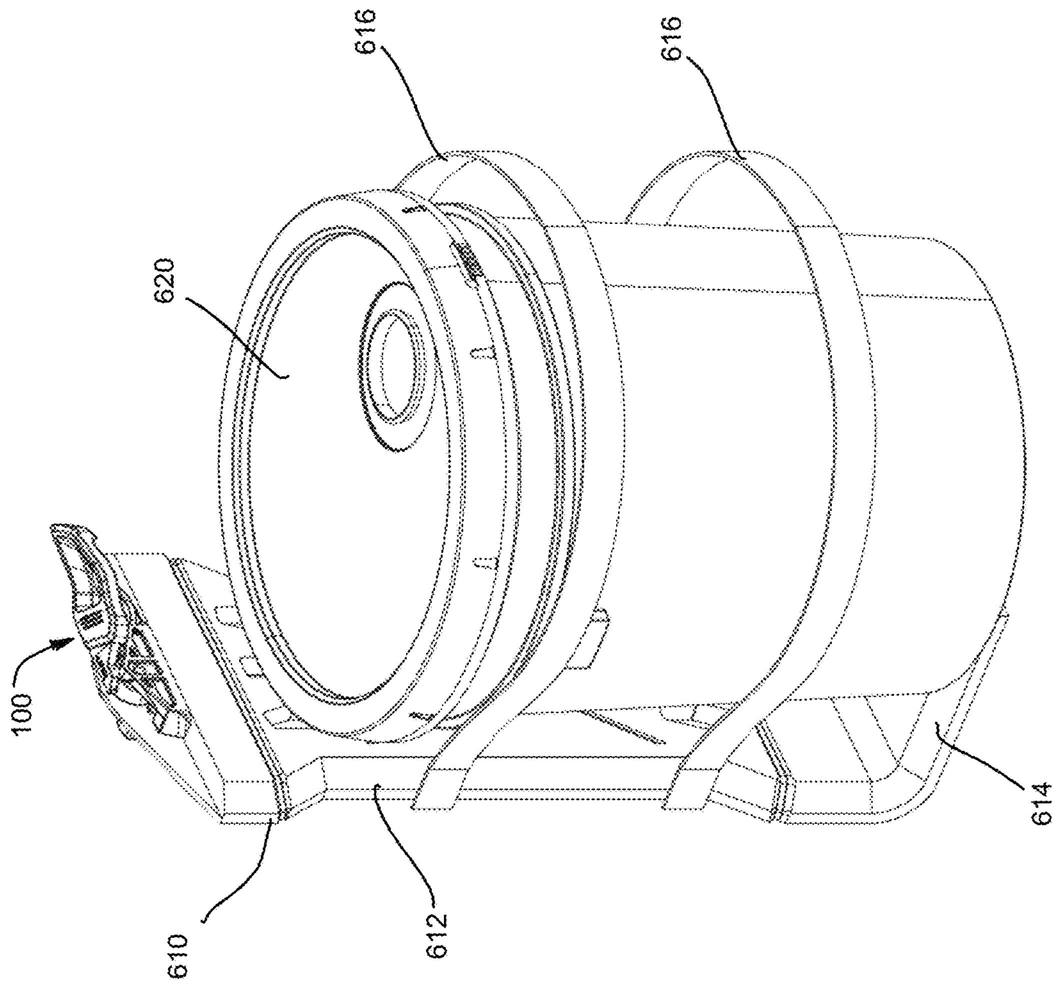
FIG. 33 is a perspective view of the accessory holder of FIG. 32 with a bucket accessory connected thereto.
Figure 34:
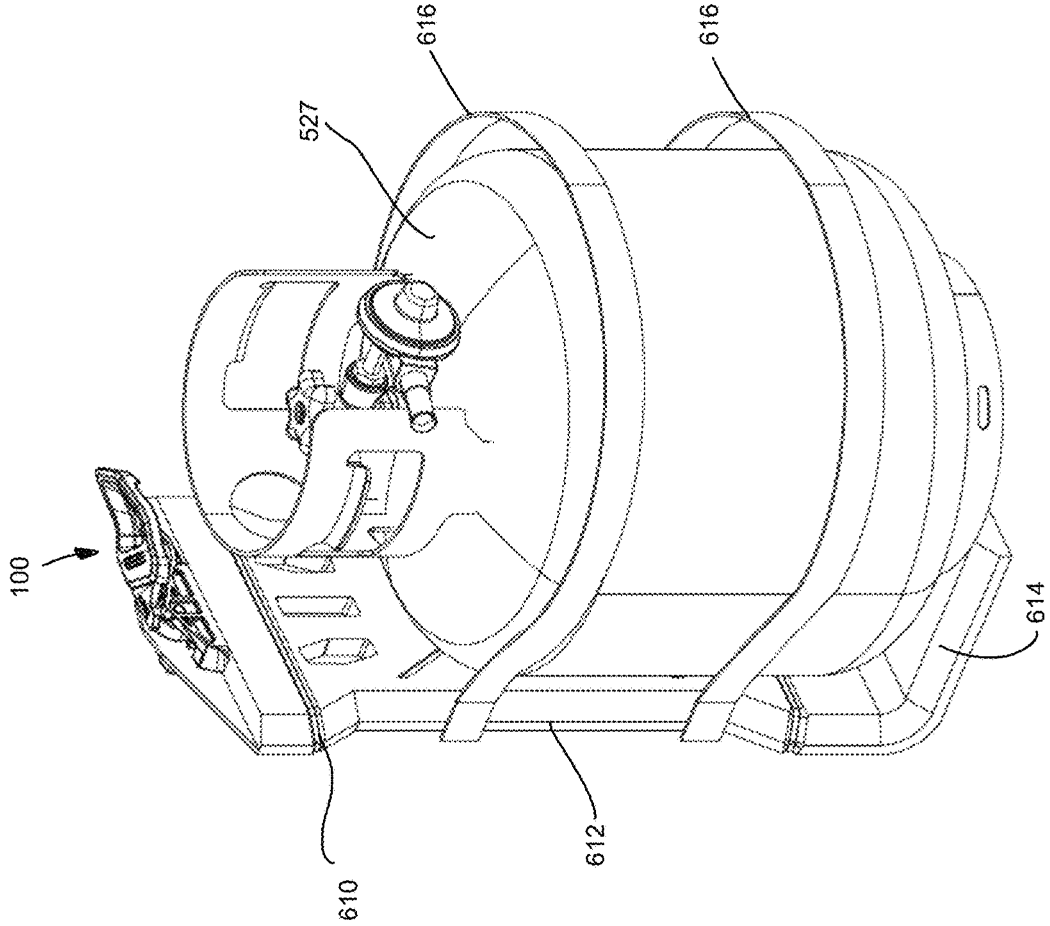
FIG. 34 is a perspective view of the accessory holder of FIG. 32 with a gas tank connected thereto.
Figure 35:
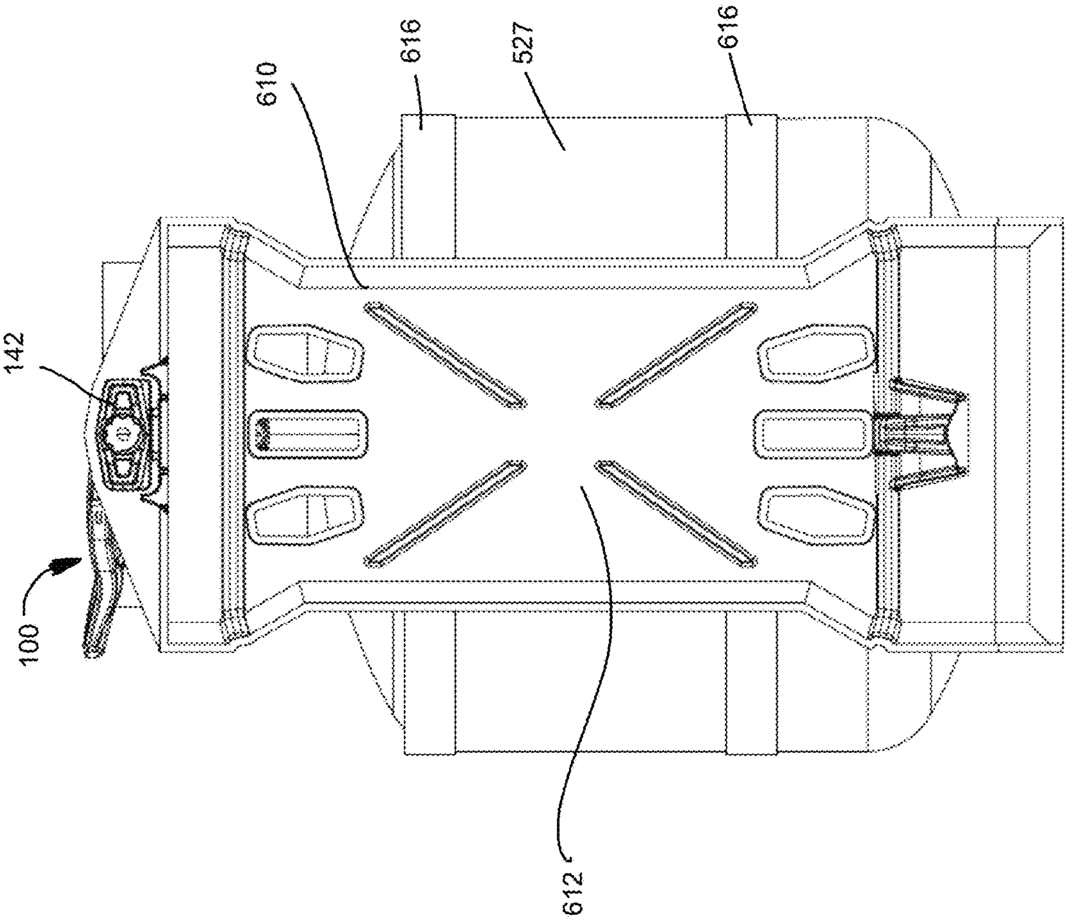
FIG. 35 is a rear elevation view of the accessory holder and gas tank of FIG. 34.
Figure 36:
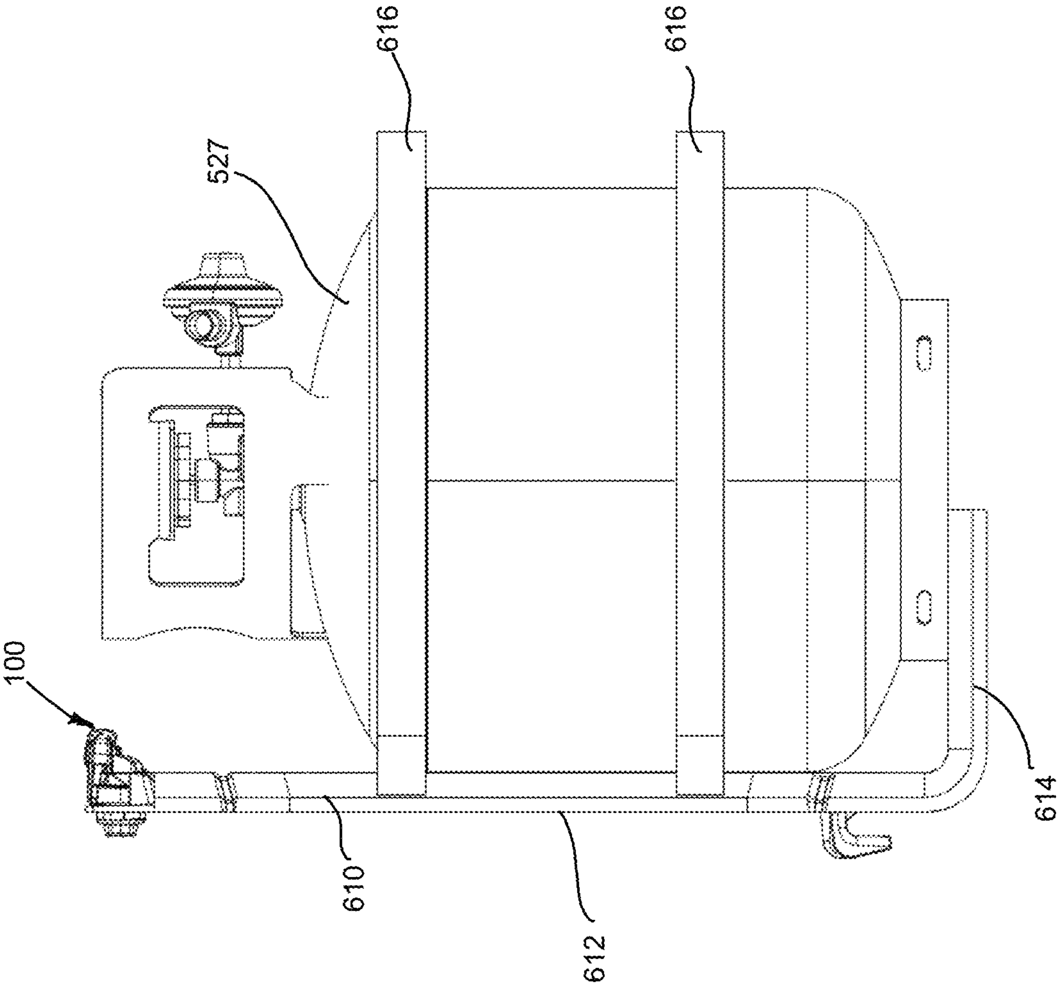
FIG. 36 is side elevation view of the accessory holder and gas tank of FIG. 34.

FIG. 32 shows an accessory holder 610 configured to connect an accessory to the panels 451. In particular, the accessory holder 610 is designed for use with a generally cylindrical accessory such as a bucket 620 (FIG. 33) or the gas tank 527 (FIGS. 34 to 36). As shown in FIG. 32, the accessory holder 610 is generally L-shaped, having a body including a vertical portion 612 and a horizontal portion 614 that are perpendicular to one another. Two straps 616 are connected to the vertical portion 612, each strap 616 being configured to surround the accessory to be held by the accessory holder (see FIGS. 33 to 36). An anchor 100 is connected at the top end of the vertical portion 612. As shown in FIG. 35, the cams 142 of the anchor 100 protrude from the rear side of the accessory holder 610. As such, the accessory holder 610 can be connected to an anchor fixture provided on a vertically-extending surface, such as when the panels 451 are in the storage position (see FIG. 26).

Figure 6:
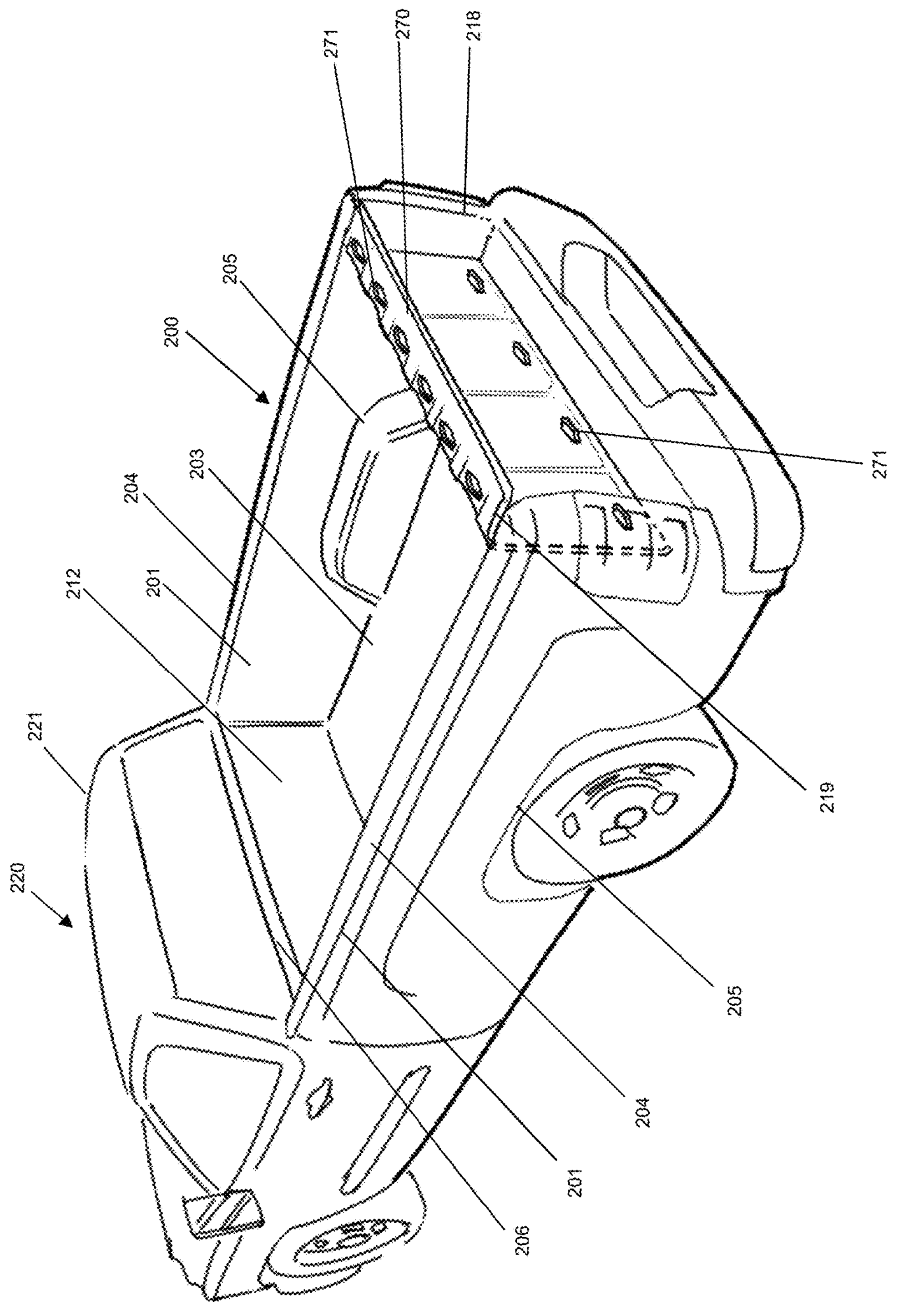
FIG. 6 is a perspective view of a pickup truck with a tailgate lining, a tailgate of the pickup truck being removed to expose the tailgate lining.

Turning to FIG. 6, a tailgate lining 270 is provided in the tonneau 200. The tailgate lining 270 has an L-shaped profile. The tailgate lining 270 can be used in combination with the lining 210. When placed into the tonneau 200, the tailgate lining 270 rests against the tailgate 218 and the tailgate top edge 219. The tailgate lining 270 has several tailgate apertures 271, which allow for the attachment of the anchor 100 or accessories with built-in anchors. The apertures 271 are placed at various locations on the tailgate lining 270, including along the horizontal section and the bottom of the vertical section of the tailgate lining 270.

Figure 7A:
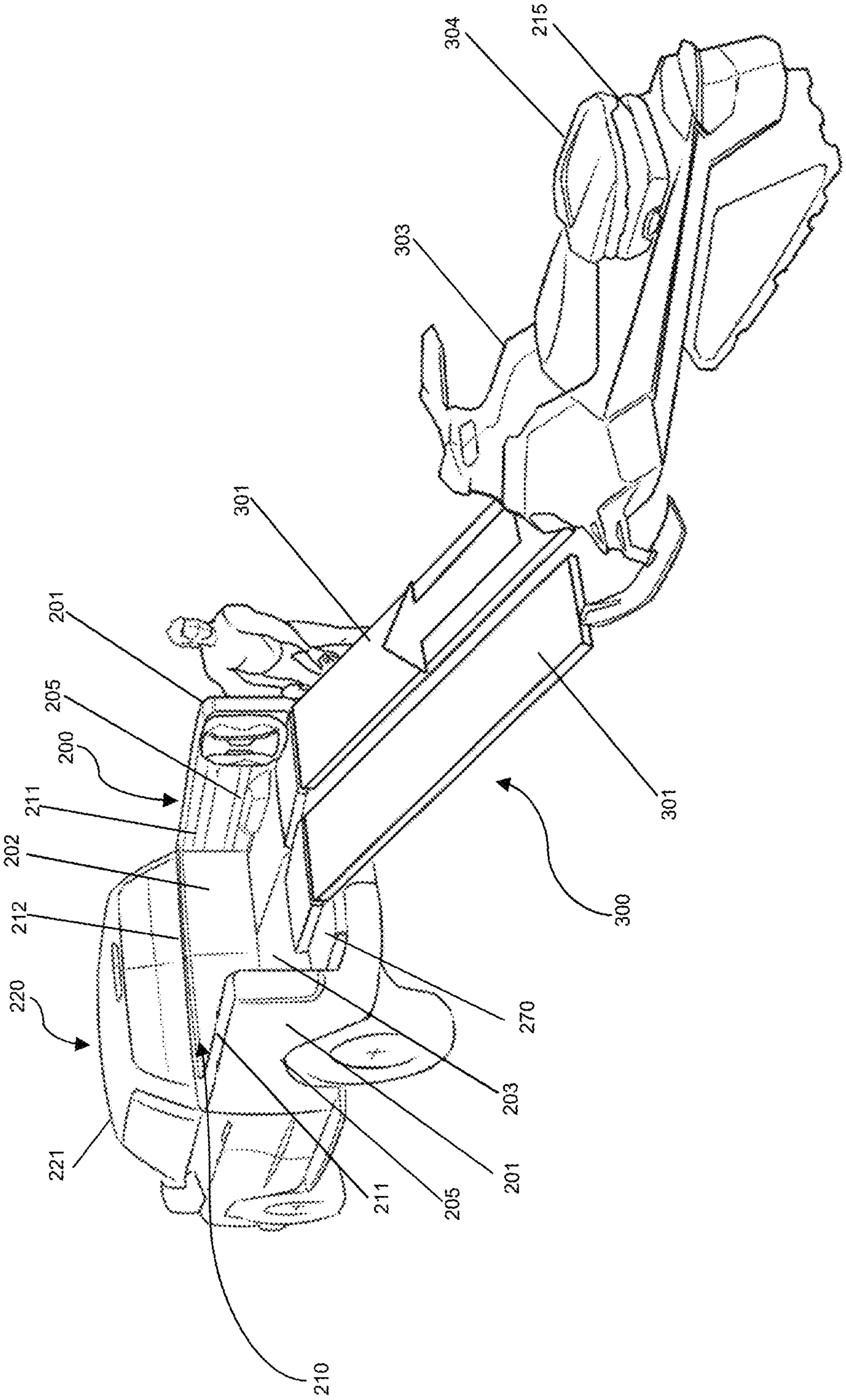
FIG. 7A is a perspective view of a ramp according to a first embodiment attached to a pickup truck.

Turning to FIG. 7A, the tailgate lining 270 and lining 210 may be used to attach a ramp 300 to the pickup truck 220. The ramp 300 has two ramp panels 301 which are fastened to the tailgate lining 270 using anchors 100. The ramp panels 301 are rectangular and of a sufficient length to reach the ground when attached to the tailgate lining 270. A vehicle, in this case a snowmobile 303, may be driven up the ramp 300 into the tonneau 200. The snowmobile 303 has the jerry can 215 and a bag 304 attached to it using built-in anchors.

Figure 7B:
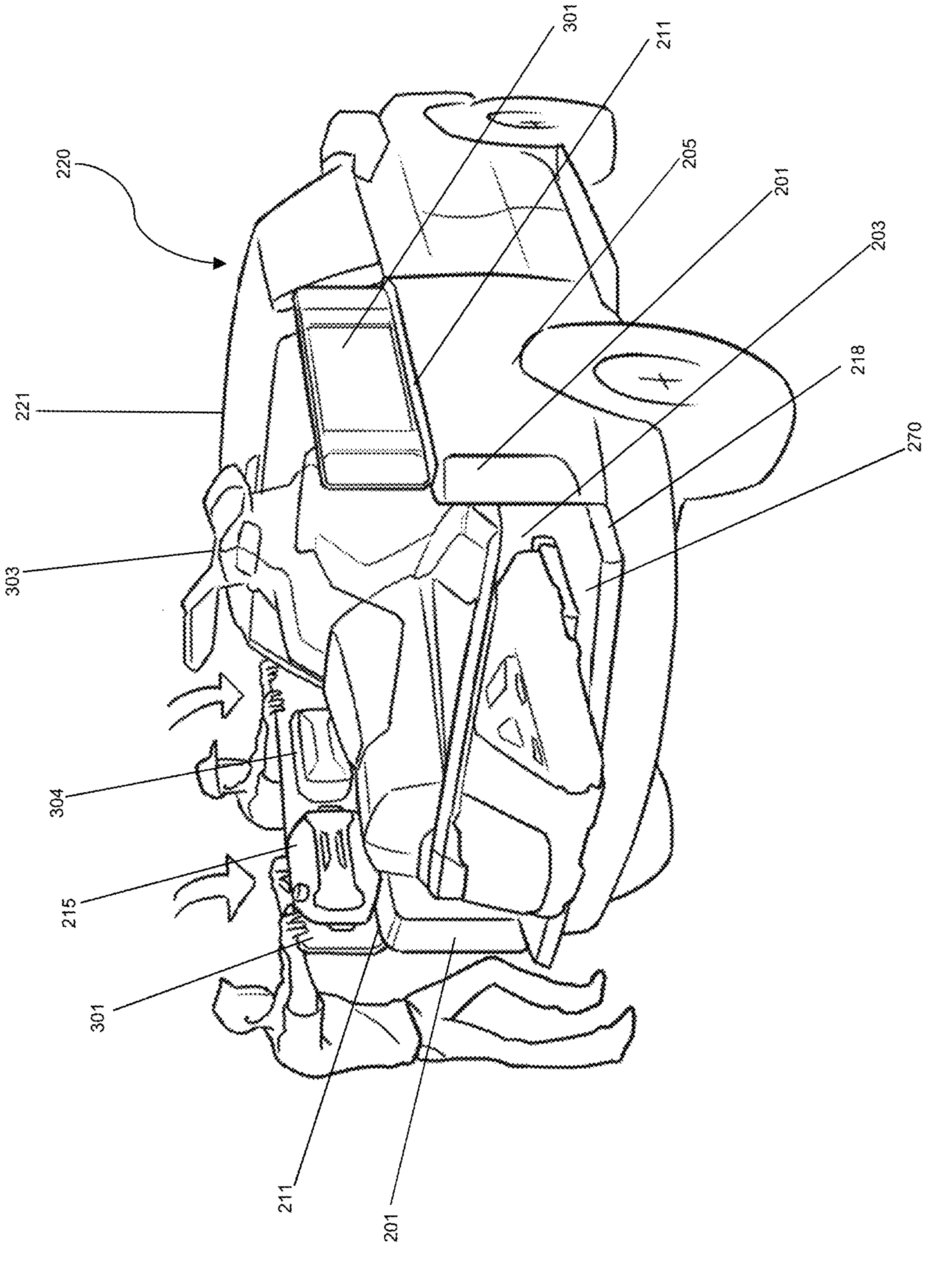
FIG. 7B is a perspective view of the ramp of FIG. 7A dismantled and attached to the tonneau of the pickup truck.

Turning to FIG. 7B, once the snowmobile 303 is in the tonneau 200, the ramp 300 can be removed from the tailgate lining 270 by unlocking the anchors 100. Each ramp panel 301 is fastened to the lining side walls 211 of the lining 210 using anchors 100. The ramp panels 301 are fastened in an orientation that extends the height of the side walls 201. It is contemplated that the ramp panels 301 may be oriented in various directions. The ramp panels 301 are generally solid with several ramp apertures (not shown) and that allow for the attachment of the anchor 100 or accessories with built-in anchors. In FIG. 7B, the jerry can 215 and bag 304 are attached to one of the ramp panels 301 using built-in anchors.

Figure 8:
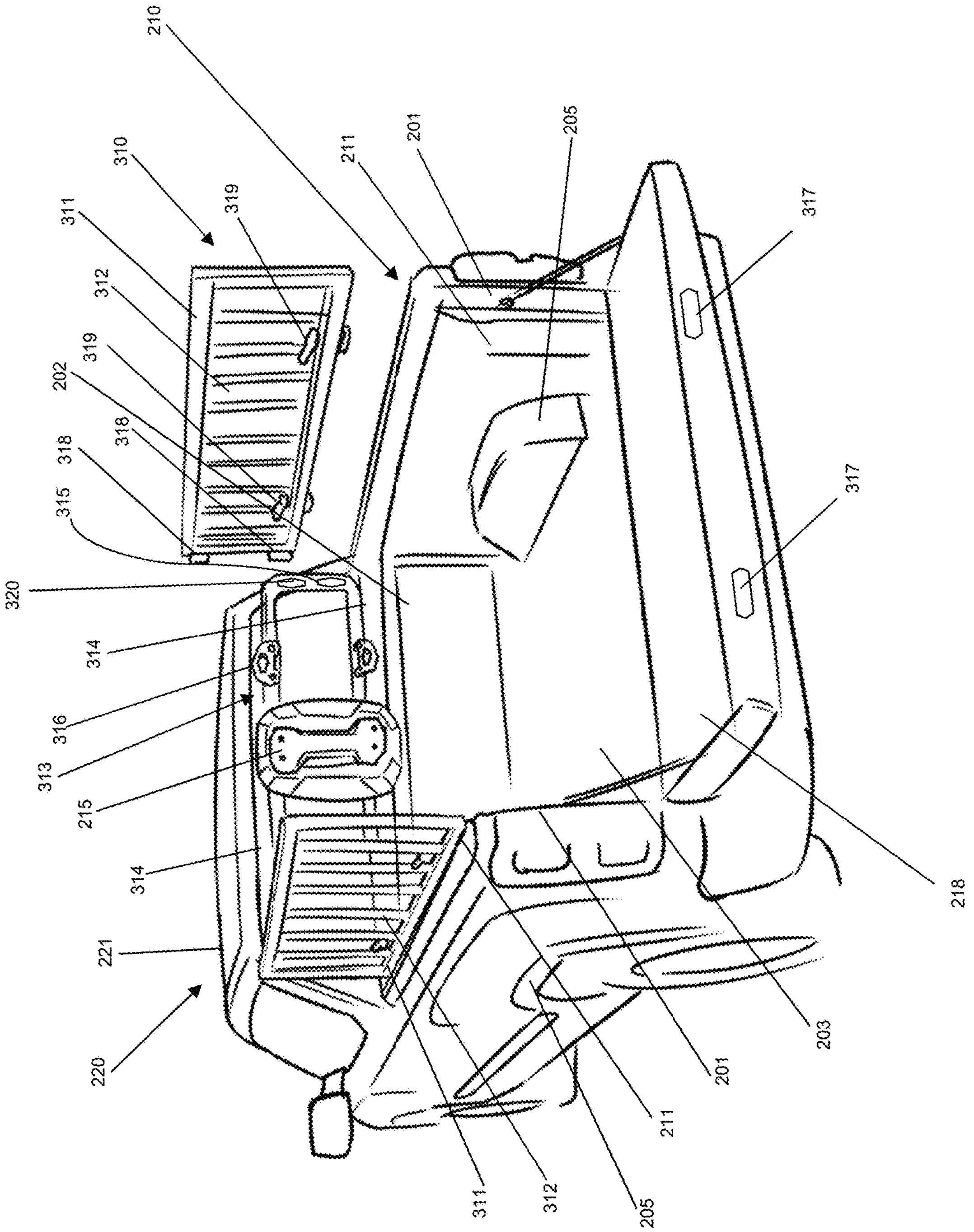
FIG. 8 is a perspective view of a ramp according to a second embodiment, dismantled and attached to the tonneau of a pickup truck.

In a second embodiment, shown in FIG. 8, a ramp 310 has ramp panels 311. The ramp panels 311 have rectangular holes 312 spaced along the length of the ramp panel 311, which creates a ladder-like structure. Each ramp panel 311 has several ramp apertures (not shown) along its top and bottom edges, which allow for the attachment of the anchor 100 or accessories with built-in anchors. A front frame 313 is fastened to the front bar 212 of the lining 210 using anchors 100. When the ramp is to be transported, the ramp panels 311 are fastened to the front frame 313 and the lining side walls 211, as shown in FIG. 8. The ramp panels 311 are attached to the front frame 313 using built-in anchors 318 located along the front edge of the ramp panel 311. The ramp panels 311 are attached to the lining side walls 211 using built-in anchors 319 located along the bottom edge of the ramp panel 311. It is contemplated that the ramp panels 311 may be instead attached to the lining side walls 211 and the front frame 313 using anchors 100. When the ramp 310 is to be used, the ramp panels 311 can be removed from the front frame 313 and lining side walls 211 by unlocking the built-in anchors 318, 319. The ramp panels 311 can then be connected at their front to apertures 317 defined in the tailgate 218 using the built-in anchors 318.

The front frame 313 consists of two front frame horizontal bars 314 and two front frame vertical bars 315 which are arranged in a rectangular shape. It is contemplated that the front frame 313 may have a different bar structure or may be generally solid. The front frame 313 is fastened to the front bar 212 in an orientation that extends the height of the front wall 202. The front frame 313 has several apertures 320 along its vertical bars 315 which allow for the attachment of the ramp panels 311 using the built-in anchors 318. Anchor fixtures 316, similar to that found in U.S. Pat. No. 9,751,592 issued on Sep. 5, 2017, are attached to the front frame 313. The anchor fixtures 316 provide apertures in which the anchors 100 and built-in anchors can be placed to be fastened to the front frame 313. In FIG. 8, the jerry can 215 is attached to the front frame 313 via built-in anchors fastened to the fixtures 316. It is contemplated that the front frame 313 could define apertures to be used with the anchors 100 and built-in anchors instead of or in addition to those provided by the fixtures 316.

Figure 9:
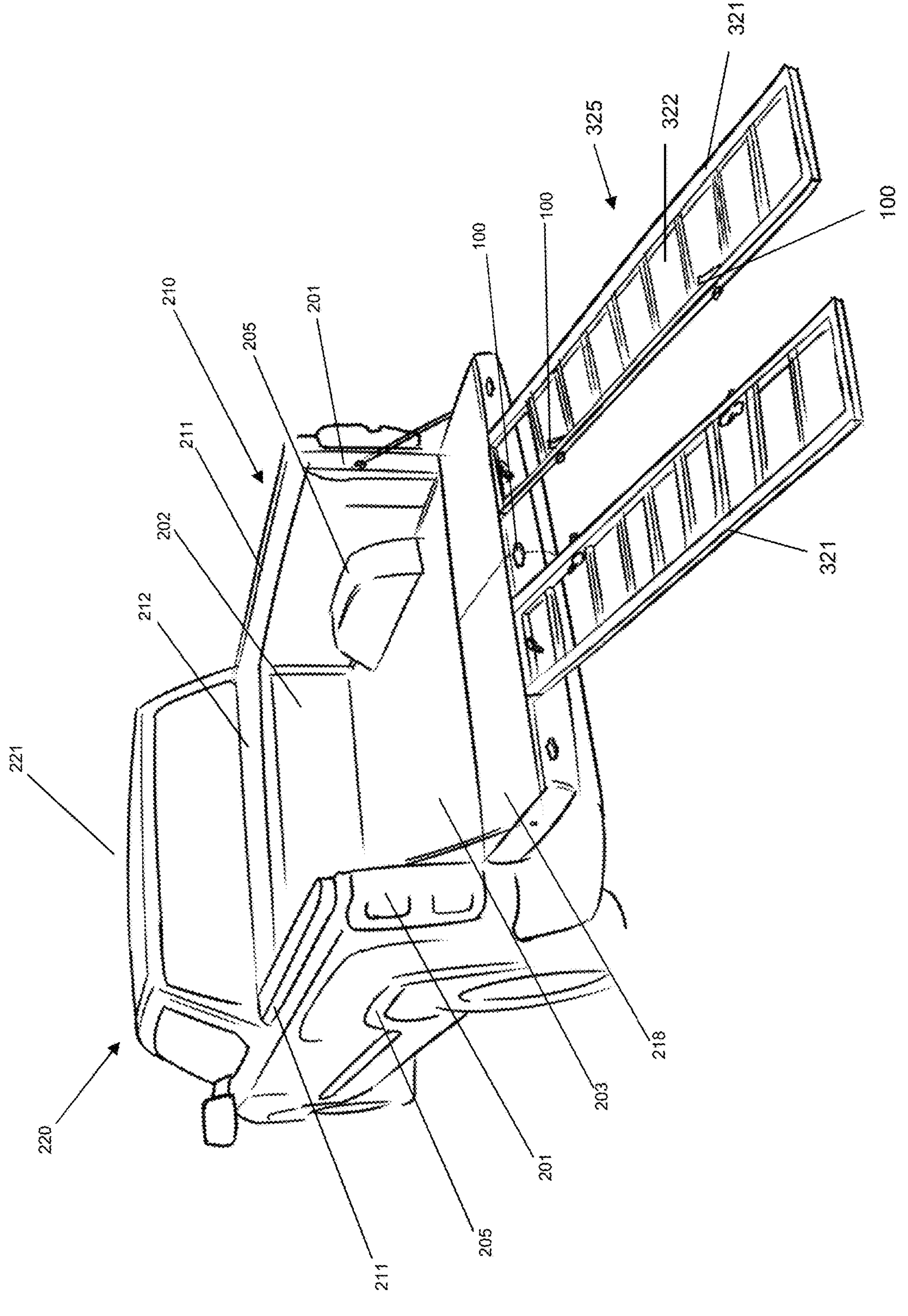
FIG. 9 is a perspective view of a ramp according to a third embodiment attached to a pickup truck.

In a third embodiment, shown in FIG. 9, a ramp 325 has ramp panels 321 with rectangular holes 322. It is contemplated that the ramp panels 321 could be provided with covers 323 covering the holes 322 in part. The covers would be placed for instance on the top side of each ramp panel 321. The covers are made of a thin material, and are as long as and narrower than the ramp panels 321. It is also contemplated that a middle panel could be placed between the ramp panels 321. The middle panel is rectangular and has the same ladder-like structure and length as the ramp panels 321. The middle panel and each ramp panel 321 have several apertures along their sides. These apertures would allow for the middle panel to be fastened to each ramp panel 321 using the anchors 100. The ramp panels 321 and the middle panel could be connected at their front to apertures (not shown) defined in the tailgate 218 using the anchors 100. It is alternatively contemplated that in embodiments where the tailgate lining 270 is provided, that the ramp panels 321 and the middle panel could be connected to the tailgate lining 270 using the anchors 100. When not being used as a ramp, the ramp panels 321 and the middle panel are connected to the lining side walls 211 and the front bar 212 of the lining 210 in a manner similar to the embodiment shown in FIG. 8.

Figure 10A:
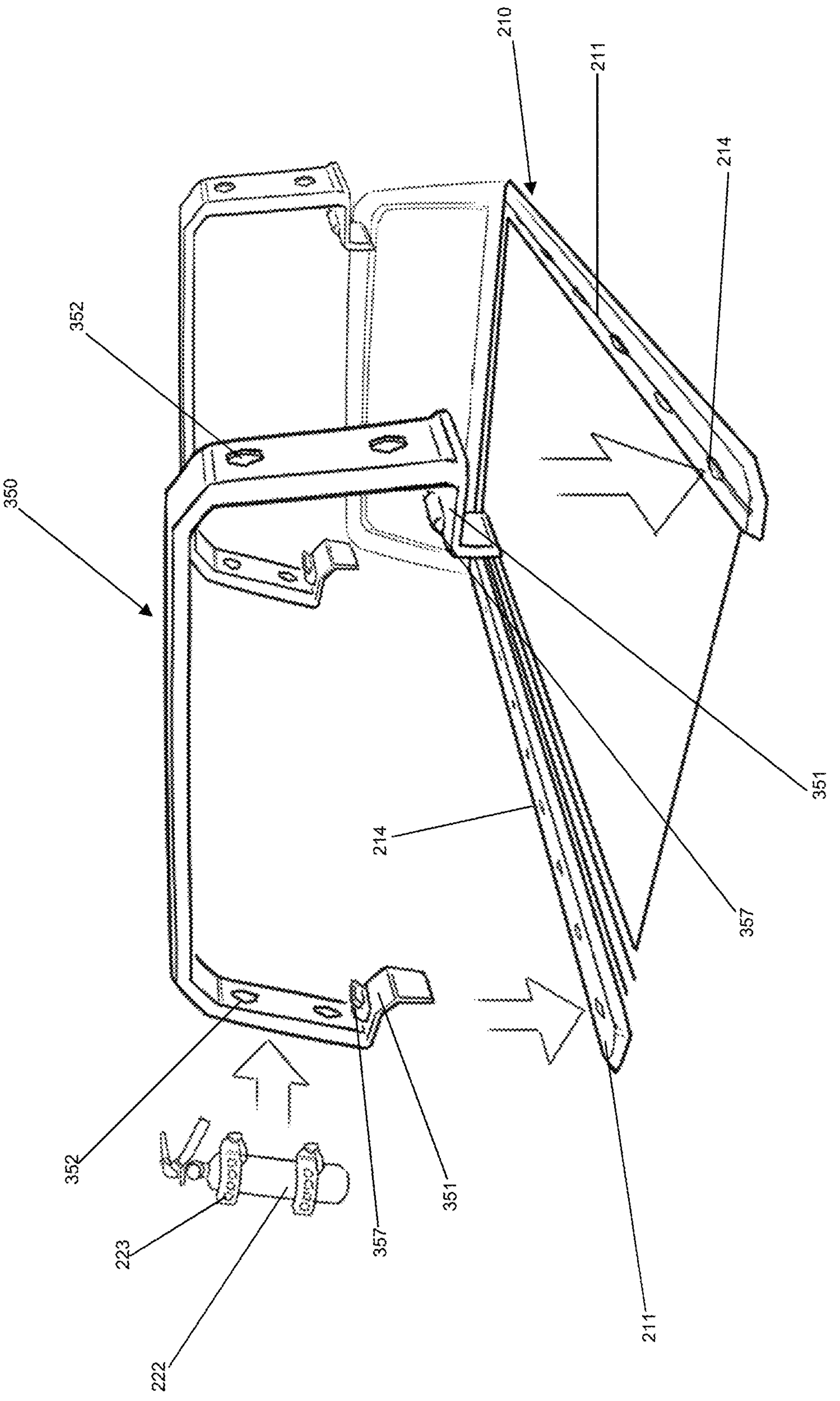
FIG. 10A is a close-up perspective, partially exploded view of a frame and the tonneau of a pickup truck.
Figure 10B:
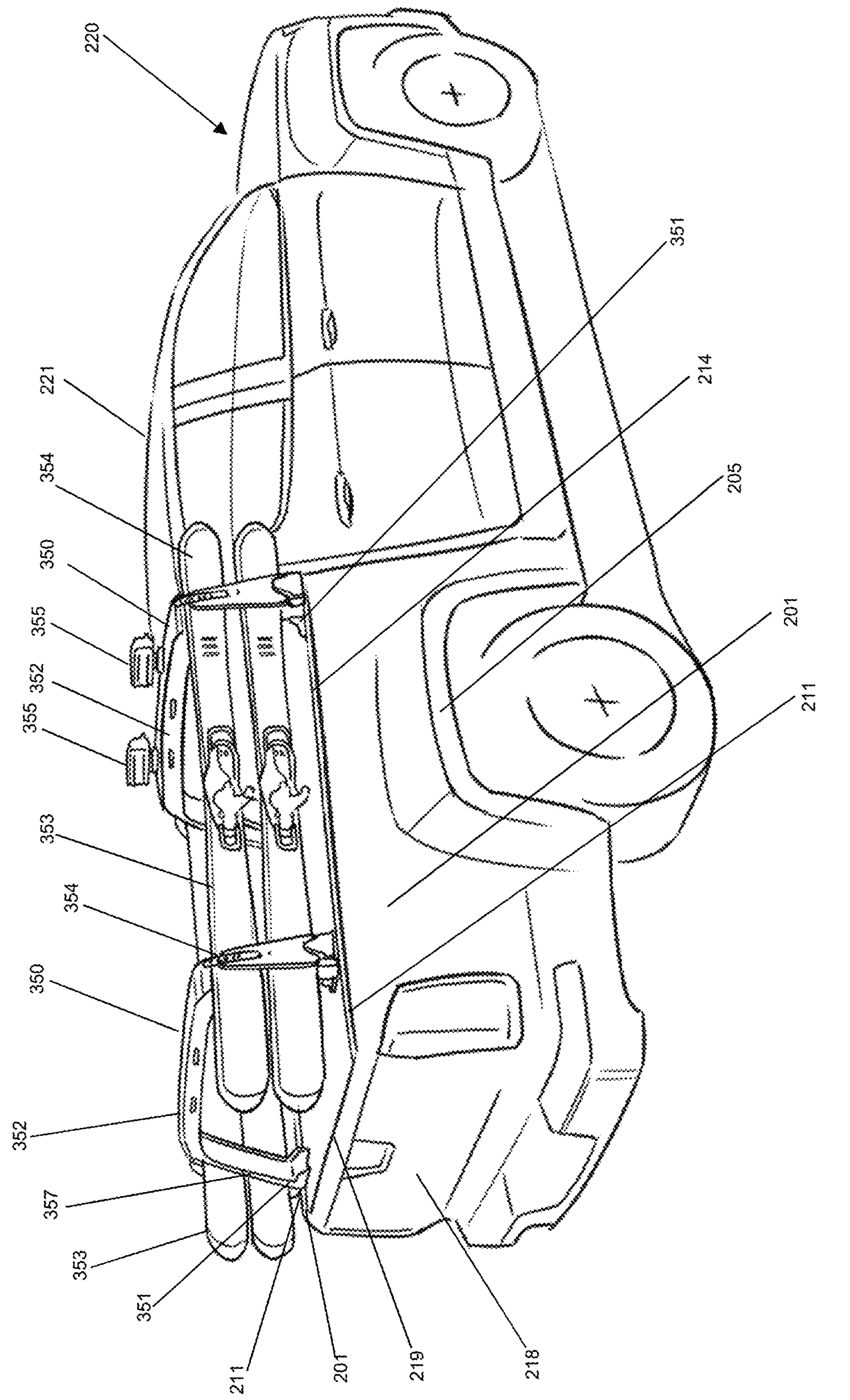
FIG. 10B is a perspective view of the pickup truck and the frame of FIG. 10A holding skis.
Figure 10C:
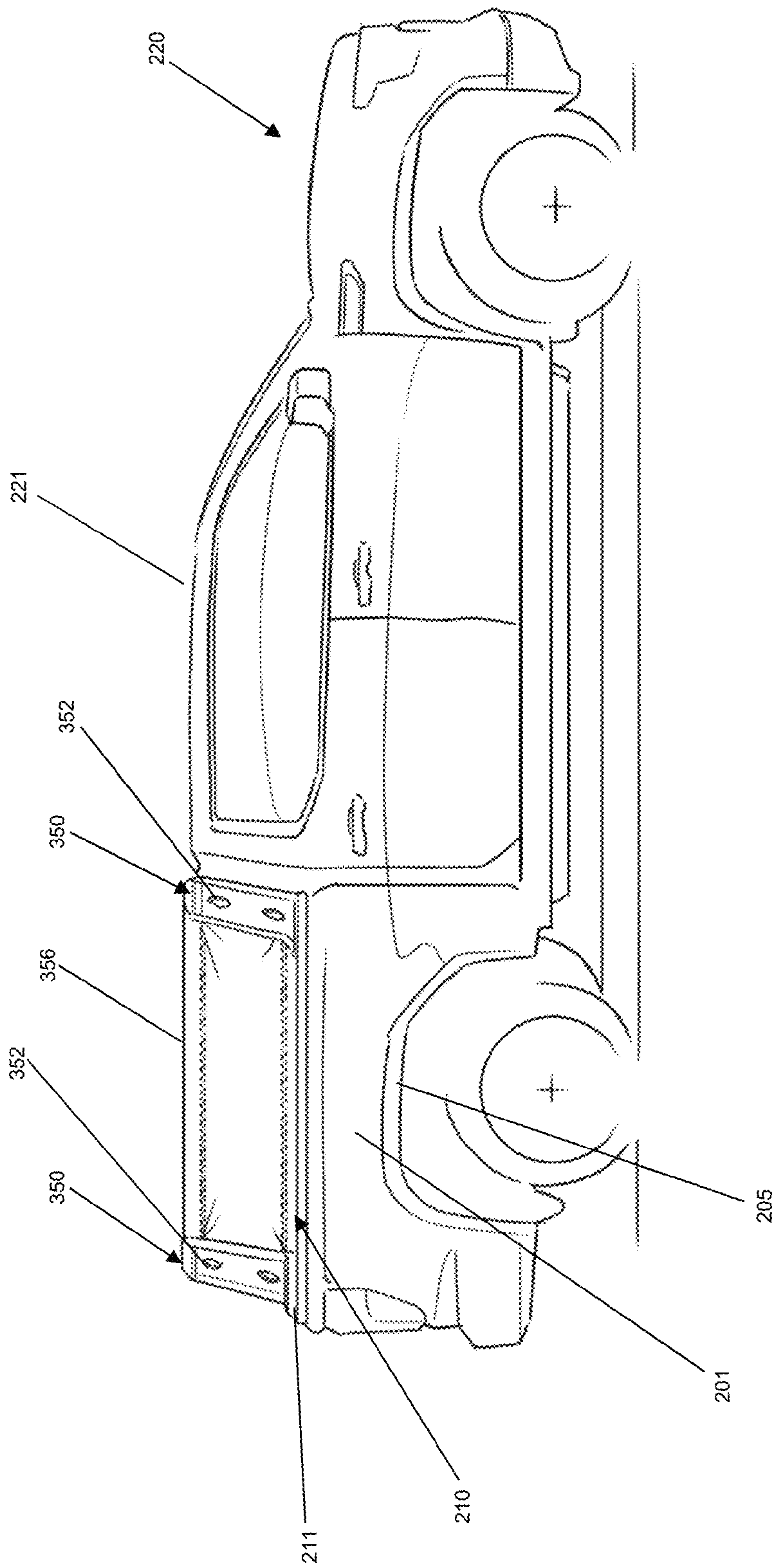
FIG. 10C is a side view of the pickup truck and the frame of FIG. 10A with a tarp attachment.

Turning to FIG. 10A, a tonneau frame 350 is fastened to the lining 210 using built-in anchors 357. The tonneau frame 350 has an inverted U-shape with a foot 351 at each end. The foot 351 includes the built-in anchor 357 and is shaped to fasten to the lining side walls 211. As shown in FIG. 10B, when the tonneau frame 350 is in place, it extends generally as high as the pickup truck cab 221. The tonneau frame 350 has several tonneau frame apertures 352 placed in various locations along its U-shape. The tonneau frame apertures 352 allow for the attachment of the anchor 100 or accessories with built-in anchors. FIG. 10A shows the fire extinguisher 222 being attached to the tonneau frame 350 using the fire extinguisher straps 223. FIG. 10B shows the attachment of skis 353 to two tonneau frames 350. The skis 353 are held against the tonneau frame 350 using a ski support bar 354, which has built-in anchors. FIG. 10B also shows lights 355 attached to the top of the tonneau frame 350 using built-in anchors. FIG. 10C shows a tarp 356 extending between two tonneau frames 350 and connected thereto using built-in anchors.

Figure 11A:
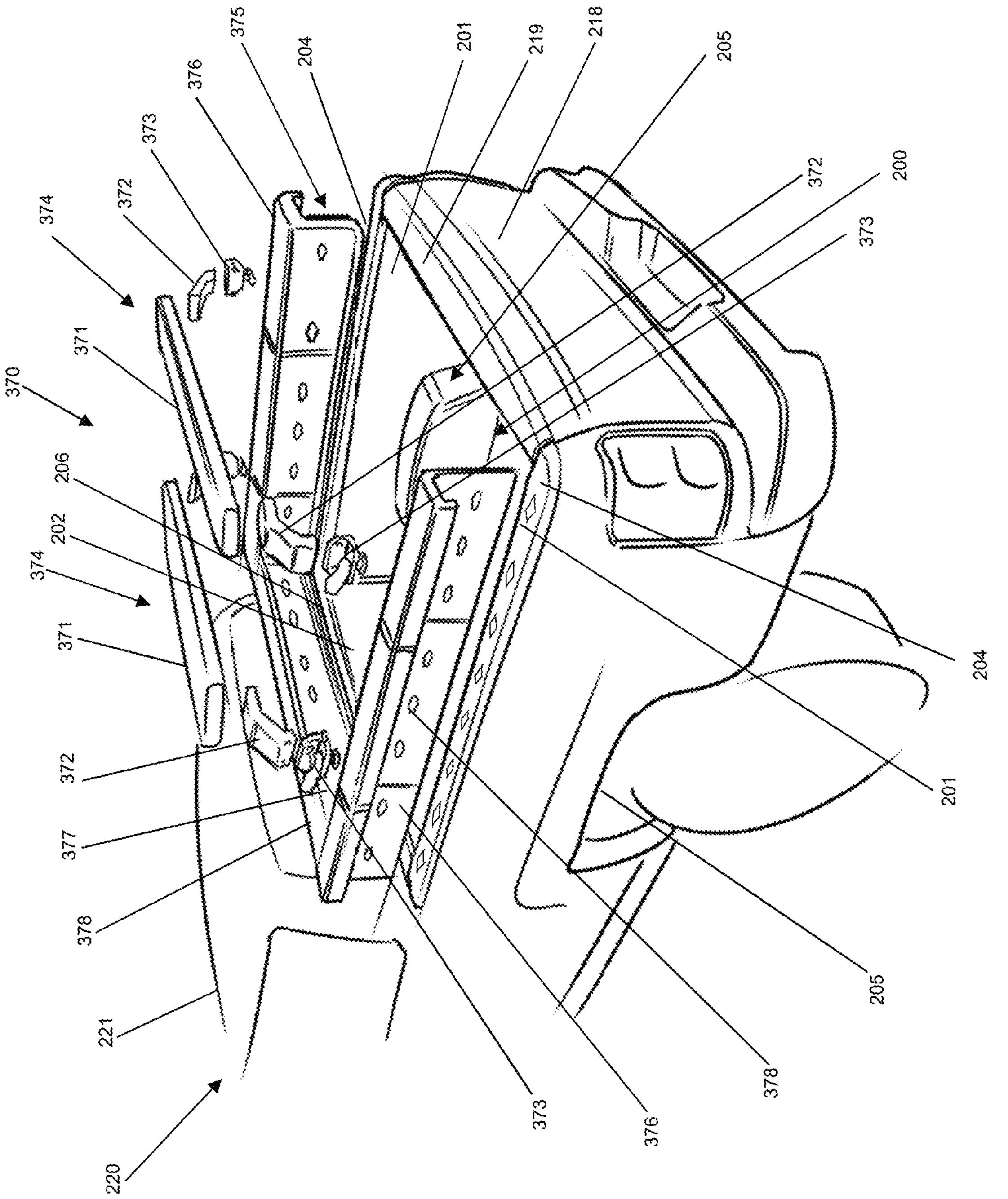
FIG. 11A is an exploded view of a rack connected to a lining in the pickup truck.

Turning to FIG. 11A, a bike rack 370 can be fastened to a lining 375. The lining 375 has two lining side walls 376 connected by a lining front wall 377. The lining side walls 376 and the lining front wall 377 have an inverted L-shaped profile. When the lining 375 is inserted into the tonneau 200, the lining side walls 376 come into contact with the side walls 201 and side wall top edges 204 of the tonneau 200. Also, when the lining 375 is in place, the lining front wall 377 comes into contact with the front wall 202 and front wall top edge 206 of the tonneau 200. The lining 375 has several lining apertures 378 which allow for the attachment of the anchor 100 or accessories with built-in anchors. The lining apertures 378 are placed along both the horizontal and vertical portions of the lining walls 376, 377. As can be seen, the lining side walls 376 are shorter than the lining side walls 211, and as such do not require recesses to accommodate the wheel wells 205.

The bike rack 370 comprises two bike supports 374. Each bike support 374 comprises a horizontal bar 371, two feet 372 and two anchoring elements 373. The anchoring elements 373 function in the same fashion as the anchors 100. The horizontal bar 371 is no wider than the tonneau 200 of the pickup truck 220. The two feet 372 connect to either end of the horizontal bar 371 and allow for it to be lifted a certain distance above the side walls 201. Each of the feet 372 are also fastened to the anchoring elements 373. The anchoring elements 373 are attached to the lining side walls 376. The bike supports 374 have several apertures which allow for the attachment of the anchor 100 or accessories with built-in anchors.

Figure 11B:
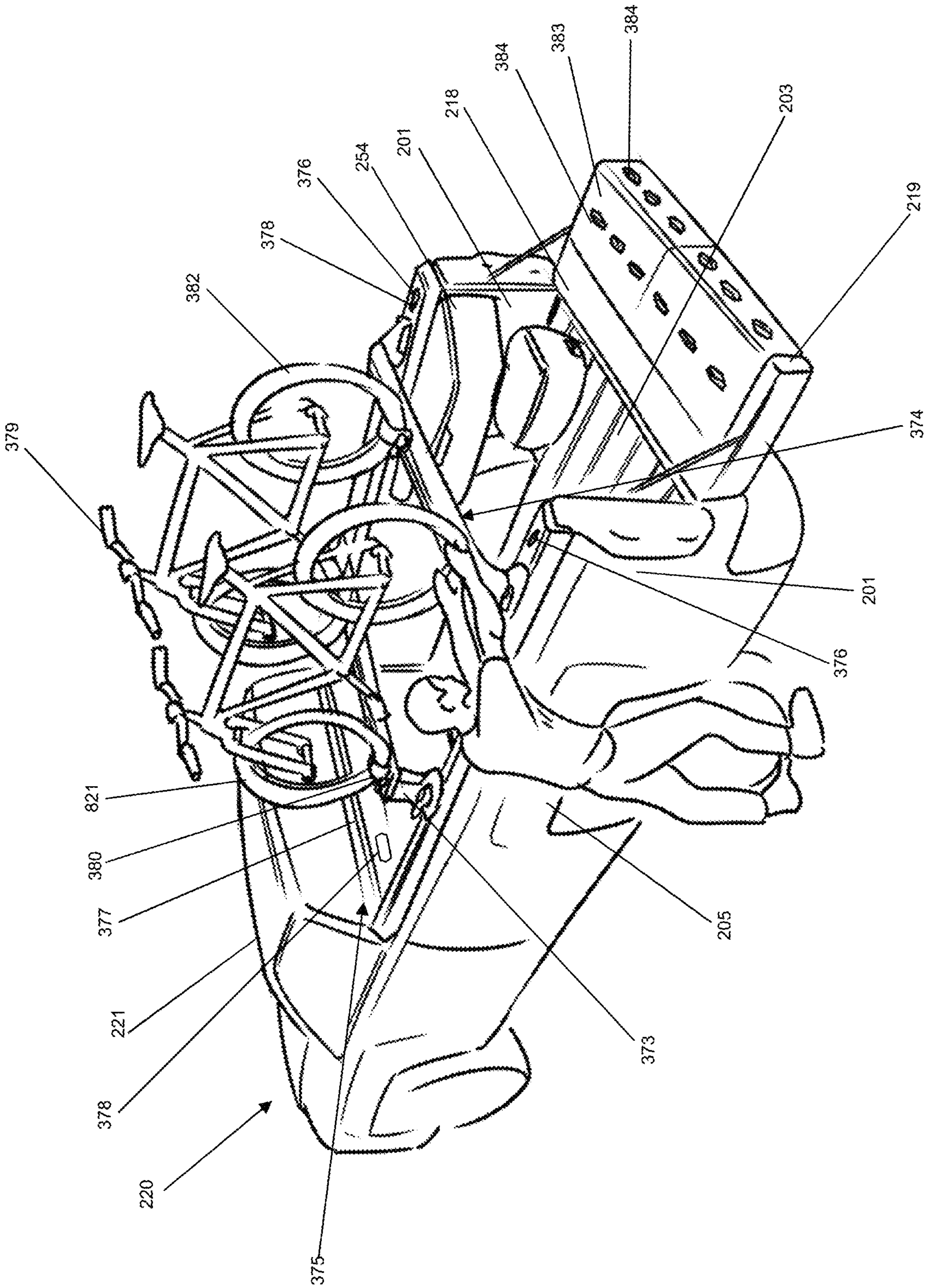
FIG. 11B is a perspective view of the rack of FIG. 11A holding bikes.

FIG. 11B shows several bikes 379 attached to the bike supports 374. The two bike supports 374 are used to support each bike 379 at each of its wheels 382. The bikes 379 are held down using bike straps 380, which are rectangular with built-in anchors at each end. The bike straps 380 pass through the wheels 382 of the bikes 379 and fasten to the bike supports 374 using the built-in anchors. In FIG. 11B, the large box 254 is attached to the lining side wall 376 below the bike rack 370 using anchors 100. A tailgate lining 383 has an inverted L-shaped profile with apertures 384 along its horizontal and vertical sections. These apertures 384 allow for the attachment of the anchor 100 or accessories with built-in anchors. When the tailgate lining 383 is placed into the tonneau 200, the tailgate lining 383 comes into contact with the tailgate 218 and tailgate top edge 219. As can be seen in FIG. 11B, the tailgate lining 383 is shorter than the tailgate lining 270.

Figure 11C:
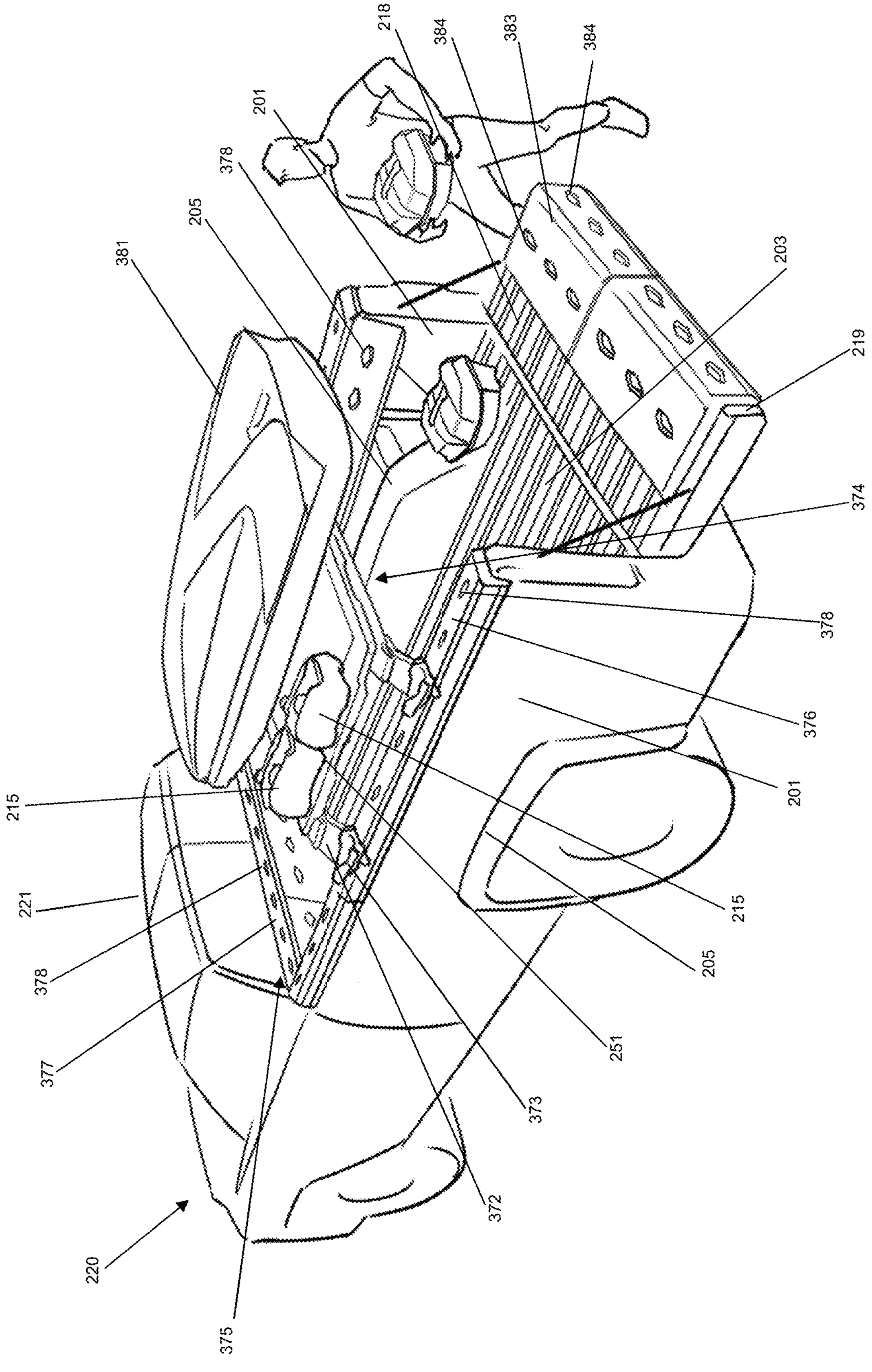
FIG. 11C is a perspective view of the rack of FIG. 11A with the panels of FIG. 4 as an attachment.

FIG. 11C shows two of the panels 251 of the tonneau cover 250 attached to the bike supports 374. Each end of the panels 251 is attached to the bike supports 374 using anchors 100. The panels 251 allow for various accessories to be transported, for example, two jerry cans 215 are fastened to the panels 251 as described above. A cargo box 381 with built-in anchors is also fastened to the panels 251.

Figure 12:
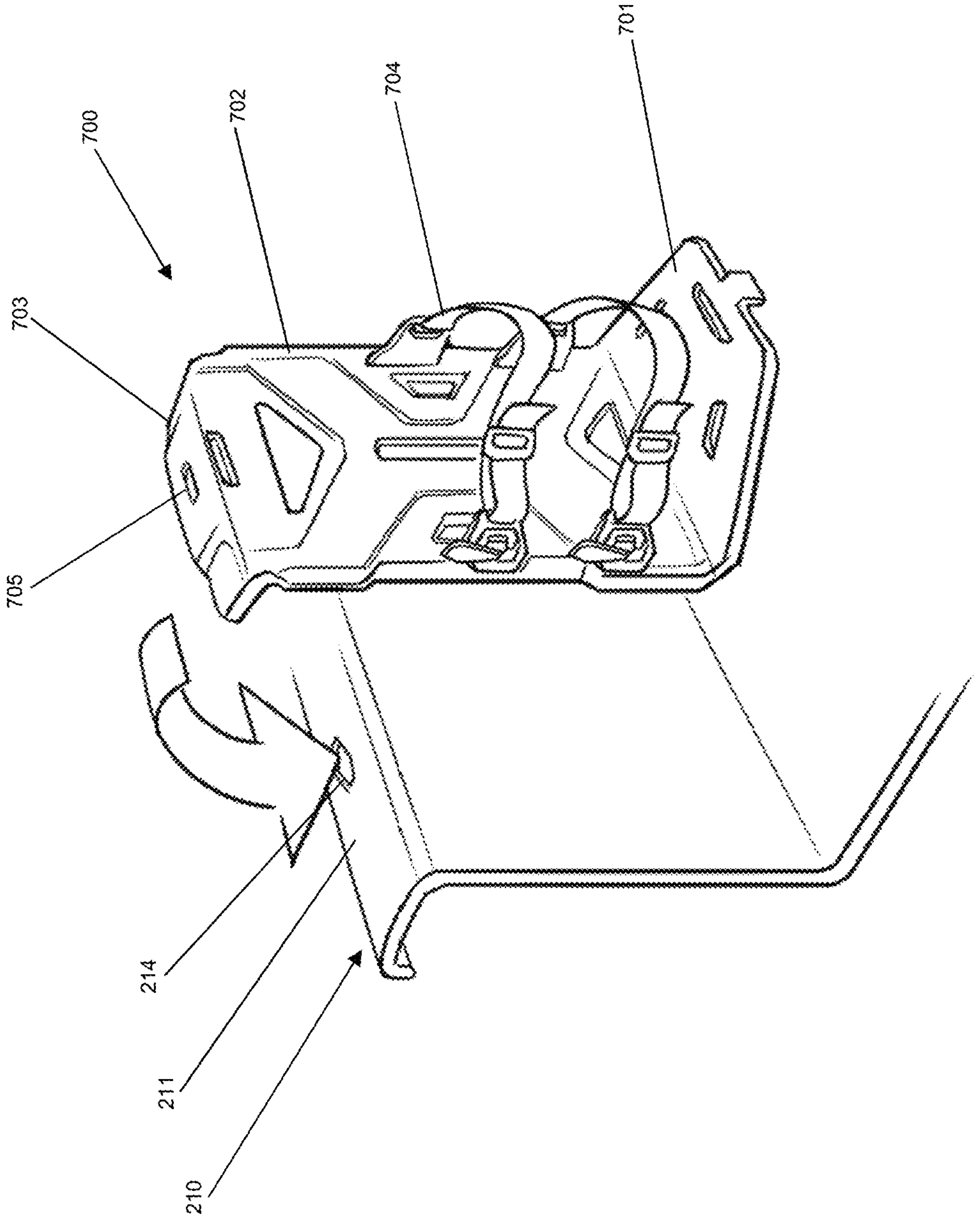
FIG. 12 is a perspective view of a stand.

Turning to FIG. 12, a stand 700 can be fastened to the lining 210 (or 375) using the anchor 100. The stand 700 can be used to hold various items, such as a bucket, propane tank or fuel caddy. The stand 700 comprises a stand base 701, a back rest 702 and a top lip 703. Two adjustable straps 704 extend from one side of the back rest 702 to the other. The top lip 703 has a stand aperture 705. To attach the stand 700 to the lining 210, the aperture 705 is aligned with an aperture 214 in a horizontal portion of the lining 210, an anchor 100 is inserted through both apertures 214, 705 and the anchor 100 is then locked. When the stand 700 is in place, the back rest 702 is adjacent to a wall of the lining 210, in this case the lining side wall 211.

Figure 13A:
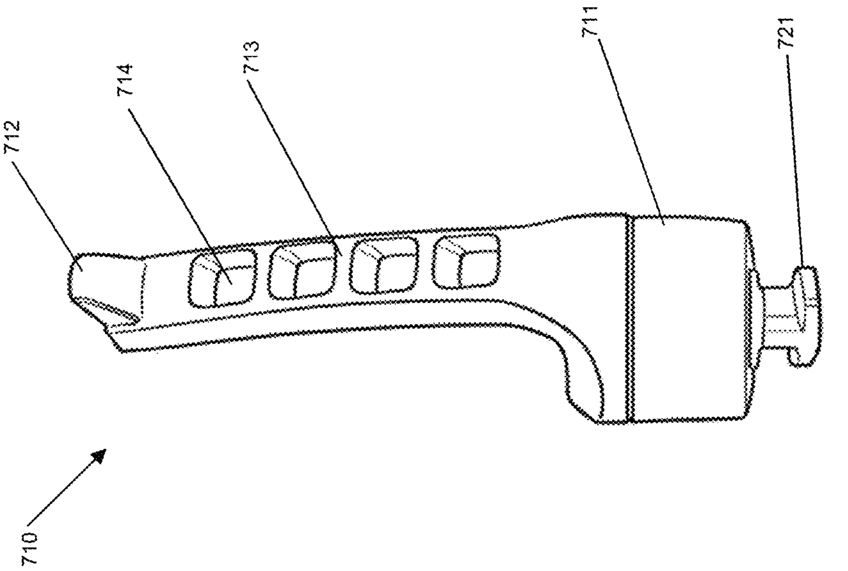
FIG. 13A is a perspective view of a holder according a first embodiment.

Turning to FIG. 13A, a holder 710 comprises a holder anchoring element 711, a hook 712 and a strap 713. The hook 712 is located at one end of the strap 713. The opposite end of the strap 713 is connected to the holder anchoring element 711. The strap 713 is generally rectangular with strap holes 714 spaced along its length. The holder anchoring element 711 functions in a fashion similar to the anchors 100, and can be attached to any of the apertures described herein. The holder anchoring element 711 has cams 721 having the same size and shape as the cams 142 of the anchor 100. The cams 721 are fixed. The cams 721 of the holder anchoring element 711 are placed into an aperture and the holder 710 is rotated in order to lock the holder anchoring element 711 to a surface defining a suitable aperture. The strap 713 is oriented in such a way that it extends in the same direction as the axis of rotation of the holder anchoring element 711. The holder 710 can be used to hold an item, for example a plant or shovel. The item is placed at the base of the strap 713 and the strap 713 is wrapped around it. Depending on the size of the item, the hook is inserted into any one of the strap holes 714. The tension in the strap 713 pulls the hook 712 back and locks the item in place.

Figure 13B:
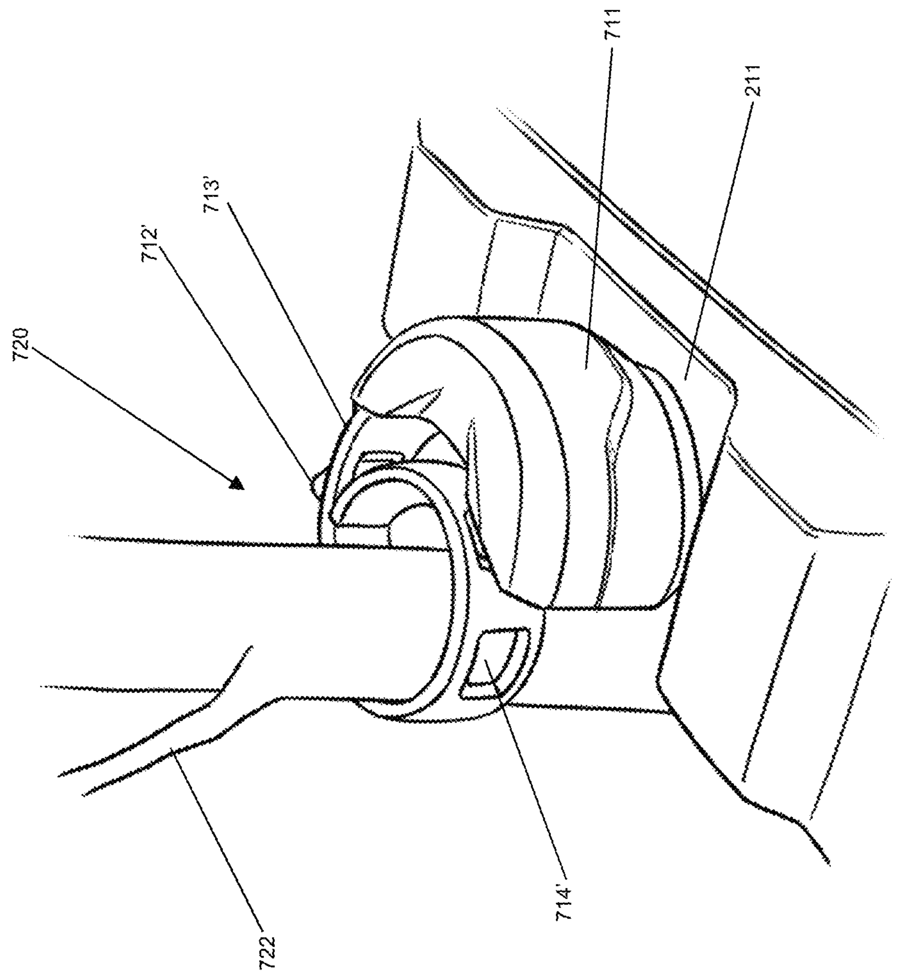
FIG. 13B is a perspective view of a holder according to a second embodiment and a plant in a pickup truck.

In a second embodiment, as shown in FIG. 13B, a holder 720 holds a tree 722 and is fastened to the lining side wall 211. The holder 720 has the same anchoring element 711 as the holder 710. It also has a strap 713' with strap holes 714' and hook 712' that are similar to the strap 713, strap holes 714 and hook 712 described above. However, the strap 713' is oriented in such a way that it extends in a perpendicular direction to the axis of rotation of the anchoring element 711.

Figure 13C:
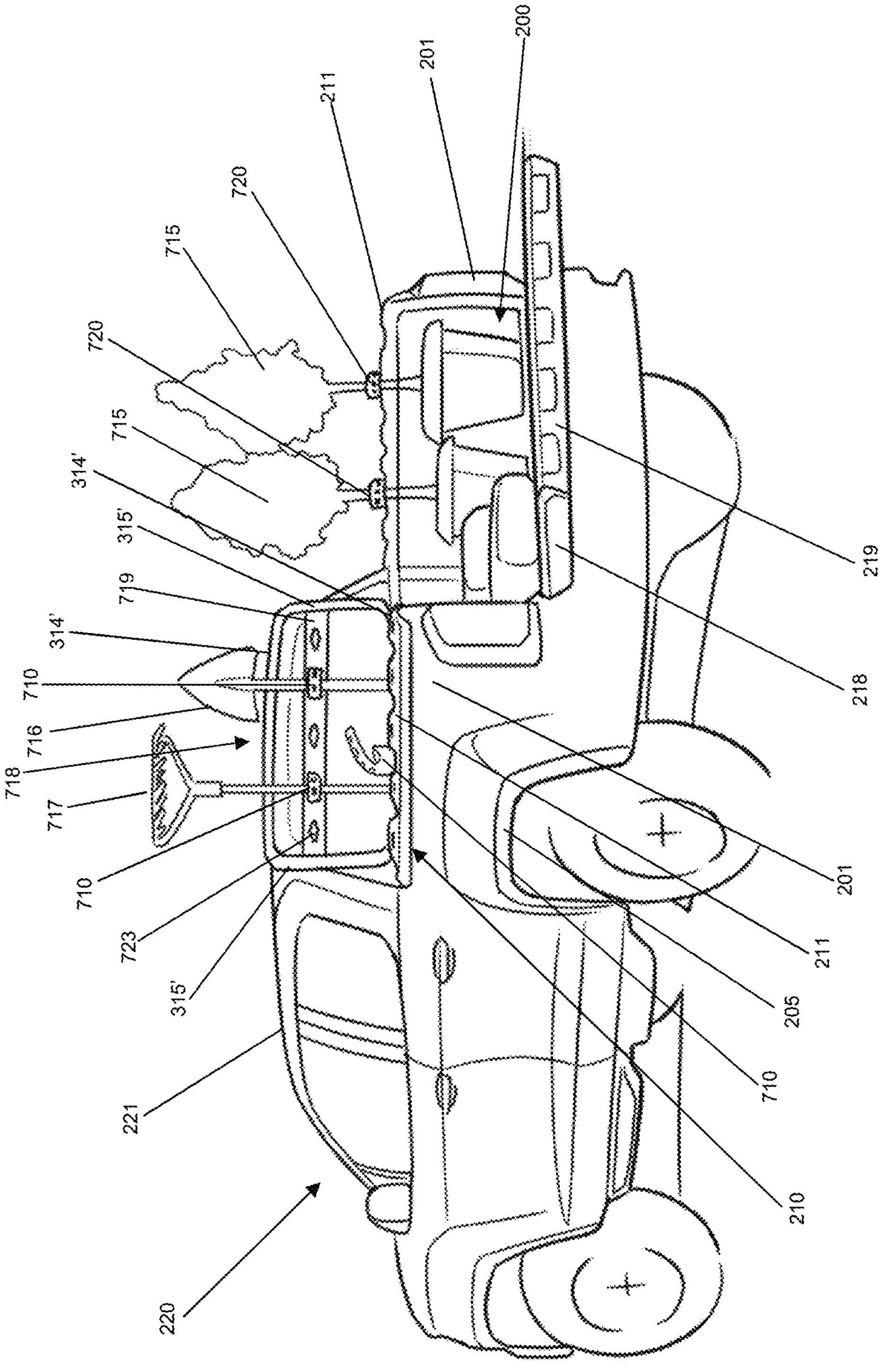
FIG. 13C is a perspective view of the holder of FIG. 13A and the holder of FIG. 13B in the tonneau of the pickup truck.

FIG. 13C shows holders 720 attaching two trees 715, and holders 710 attaching a shovel 716 and a rake 717 in place in the tonneau 200. The trees 715 are attached to the lining side wall 211. The shovel 716 and rake 717 are attached to a frame 718, similar to the front frame 313. The frame 718 has two horizontal bars 314' and two vertical bars 315' that are similar to the front frame horizontal bars 314 and front frame vertical bars 315. However, the frame 718 has an additional horizontal bar 719 that defines apertures 723 to which anchors 100 or built in anchors, such as the holders 710, 720, can be attached.

Figure 14A:
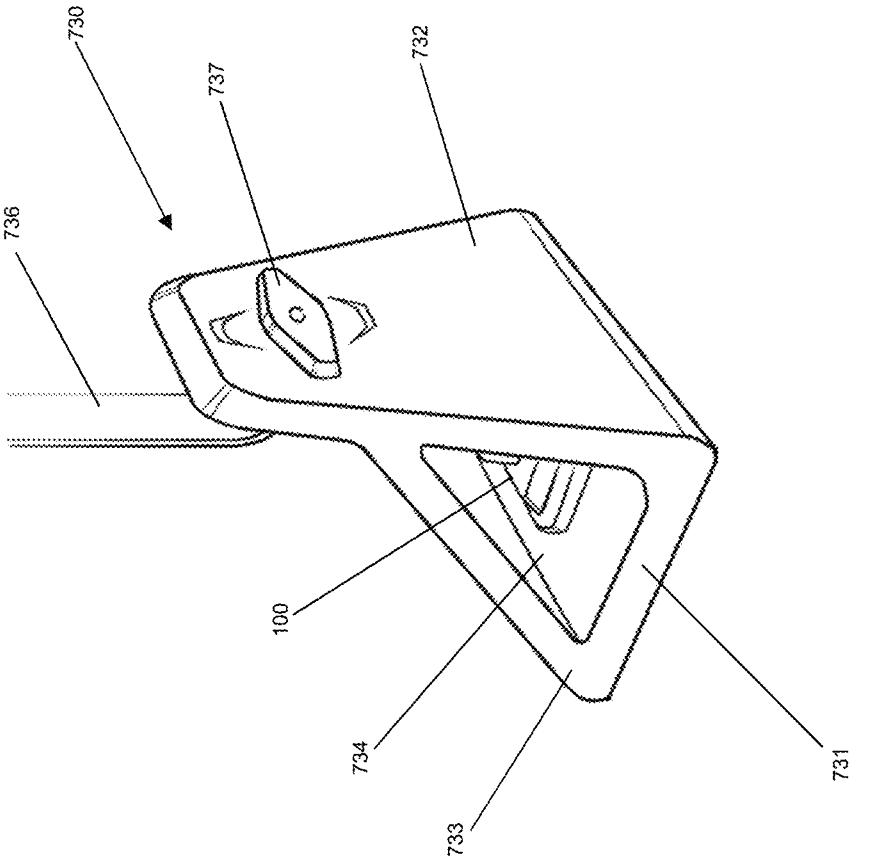
FIG. 14A is a perspective view of a bracket and strap.

Turning to FIG. 14A, a bracket 730 has a rectangular bracket base 731. A cross-section of the bracket 730 is a right-angle triangle, one leg of the triangle being formed by the bracket base 731, and the other by the bracket side wall 732. The bracket side wall 732 extends past its intersection with the hypotenuse of the triangle formed by an angled wall 733. A cavity 734 is formed within the three walls 731, 732, 733 of the bracket 730. The bracket base 731 has an aperture, which allows for the bracket base to accept an anchor 100. It is also contemplated that the anchor could be built-in. Using the anchor 100, the bracket 730 can be attached to any of the apertures described herein. Both the bracket side wall 732 and angled wall 733 have a trapezoidal shape that tapers inwards when travelling away from the bracket base 731. The bracket side wall 732 has an aperture, which can accept an anchor 100 or accessories with built-in anchors. FIG. 14A shows a strap 736 fastened to the bracket side wall 732 using a built-in anchoring element 737.

Figure 14B:
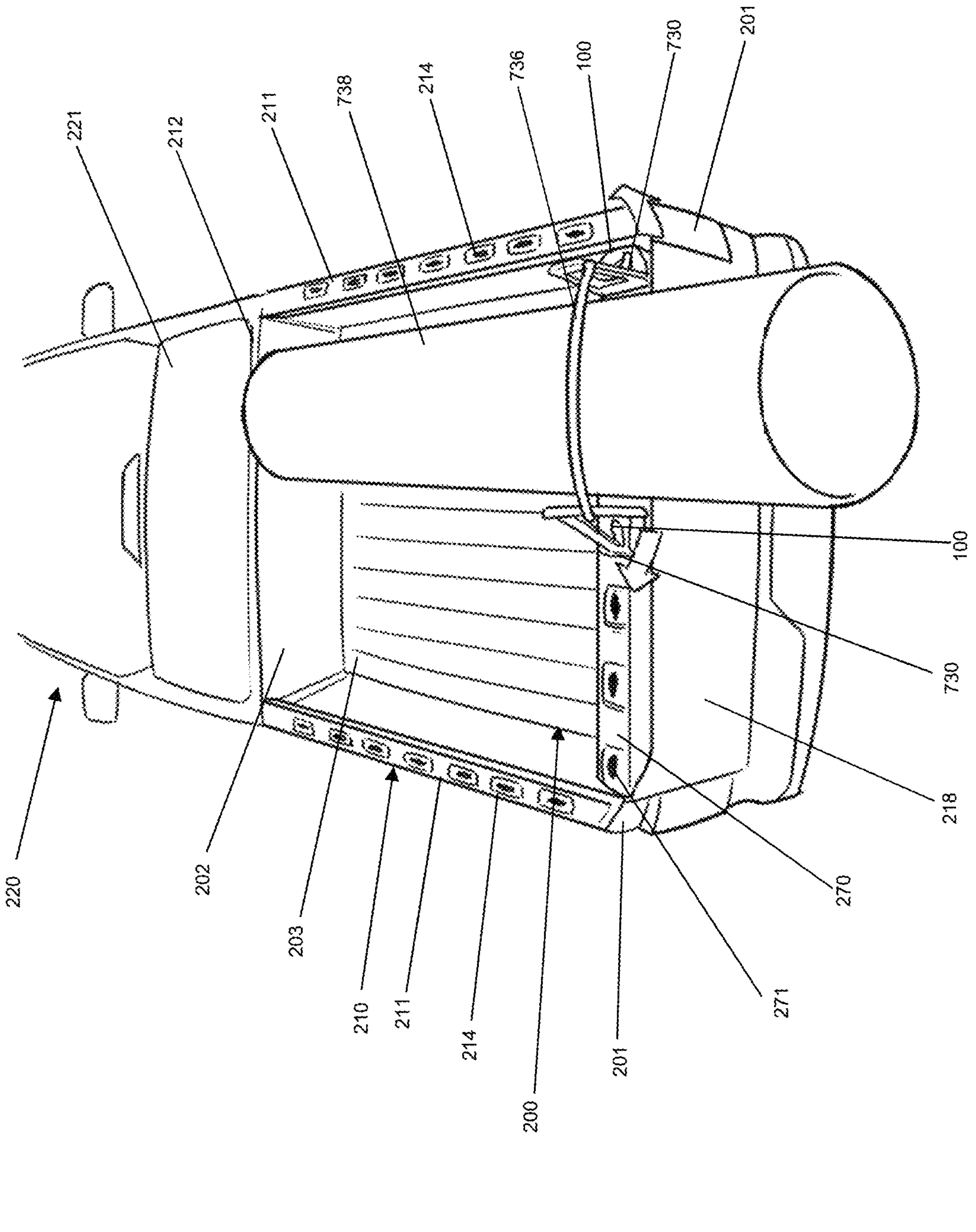
FIG. 14B is a perspective view of two sets of the bracket and strap of FIG. 14A holding an item in the tonneau of a pickup truck.

As shown in FIG. 14B, two brackets 730 can be used with the strap 736 to hold an item, such as a pipe 738. Each bracket 730 is anchored to the tailgate lining 270 (or 383) using anchors 100. The pipe 738 is placed in the tonneau 200, resting against the tailgate lining 270 and in between the brackets 730. The strap 736 is anchored to each bracket 730 and wrapped over the top of the pipe 738. It is contemplated that the brackets 736 could hold an item without the use of the strap 736, by securing the item between the bracket side wall 732 of each bracket 730.

Figure 15:
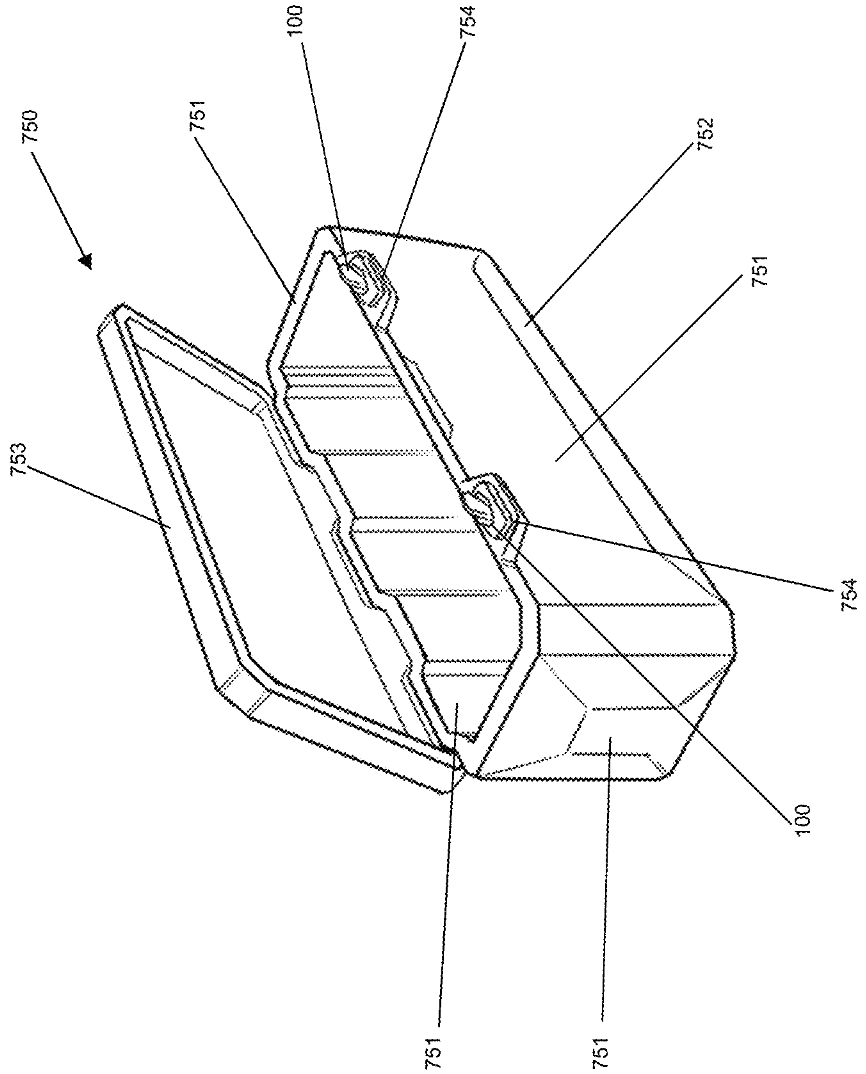
FIG. 15 is a perspective view of a box.

Turning to FIG. 15, a box 750 has four box side walls 751, a box base 752, a lid 753 and two box anchoring elements 754. The box anchoring elements 754 extend away from the top of one of the box side walls 751. The box anchoring elements 754 each have a box aperture (not shown) which allows for the box anchoring element 754 to accept an anchor 100 or accessories with built-in anchors. It is contemplated that the anchors could be built into the box anchoring elements. Using the anchor 100, the box 750 can be attached to any of the apertures described herein, for example, to the lining apertures 214 in the horizontal portions of the lining 210.

Figure 16A:
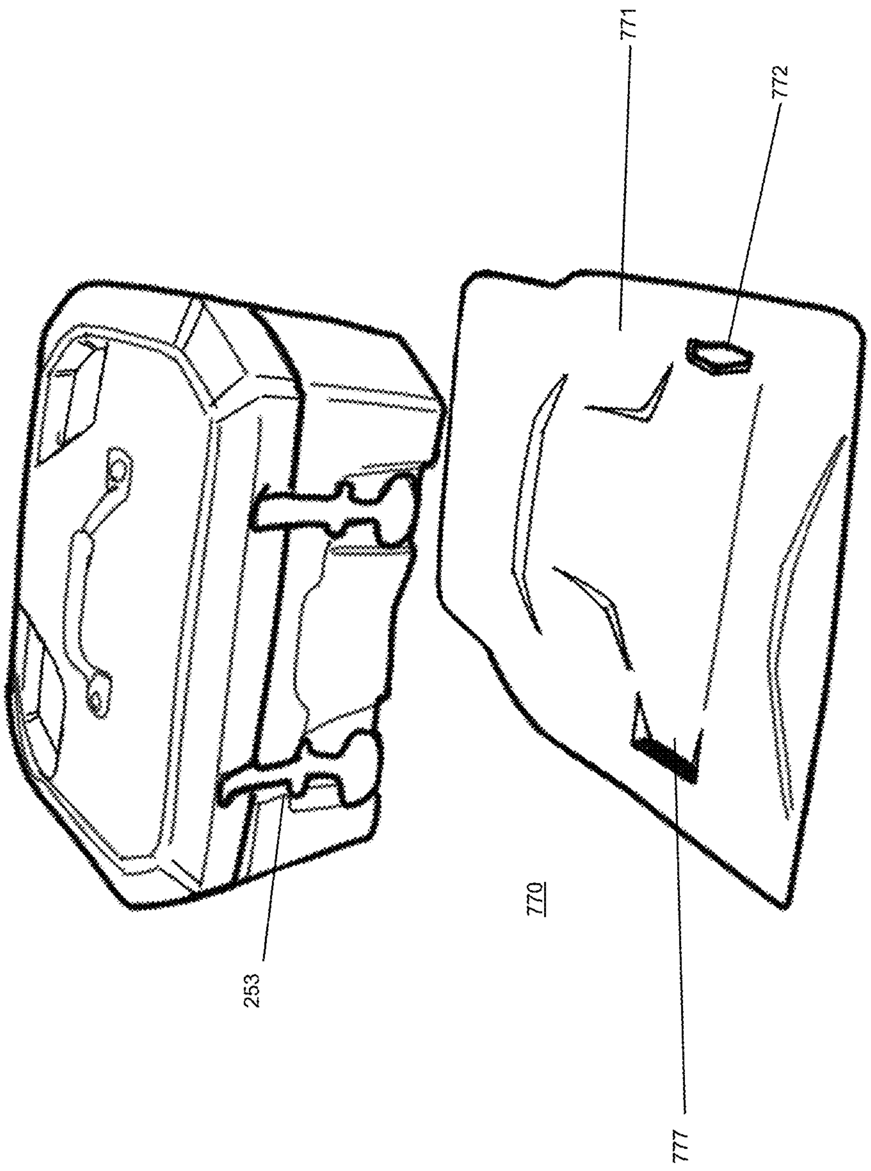
FIG. 16A is a perspective view of a floor covering inside a vehicle.

Turning to FIG. 16A, the pickup truck cab 221 has a backseat area, including a backseat floor 770. The floor is covered with a floor covering 771, which is generally rectangular and stretches the width of the backseat floor 770. The floor covering 771 has a floor covering aperture 772 which can accept an anchor 100 or accessories with a built-in anchor. The floor covering aperture 772 is placed near a back corner of the floor covering 771. The floor covering 771 also has a recess 777 located near a rear corner thereof. The recess 777 allows for properly shaped accessories to be set into the floor covering 771 without being fastened using an anchor 100 or a built-in anchor. It is contemplated that the aperture 772 and recess 777 could be defined directly in the floor 770.

Figure 16B:
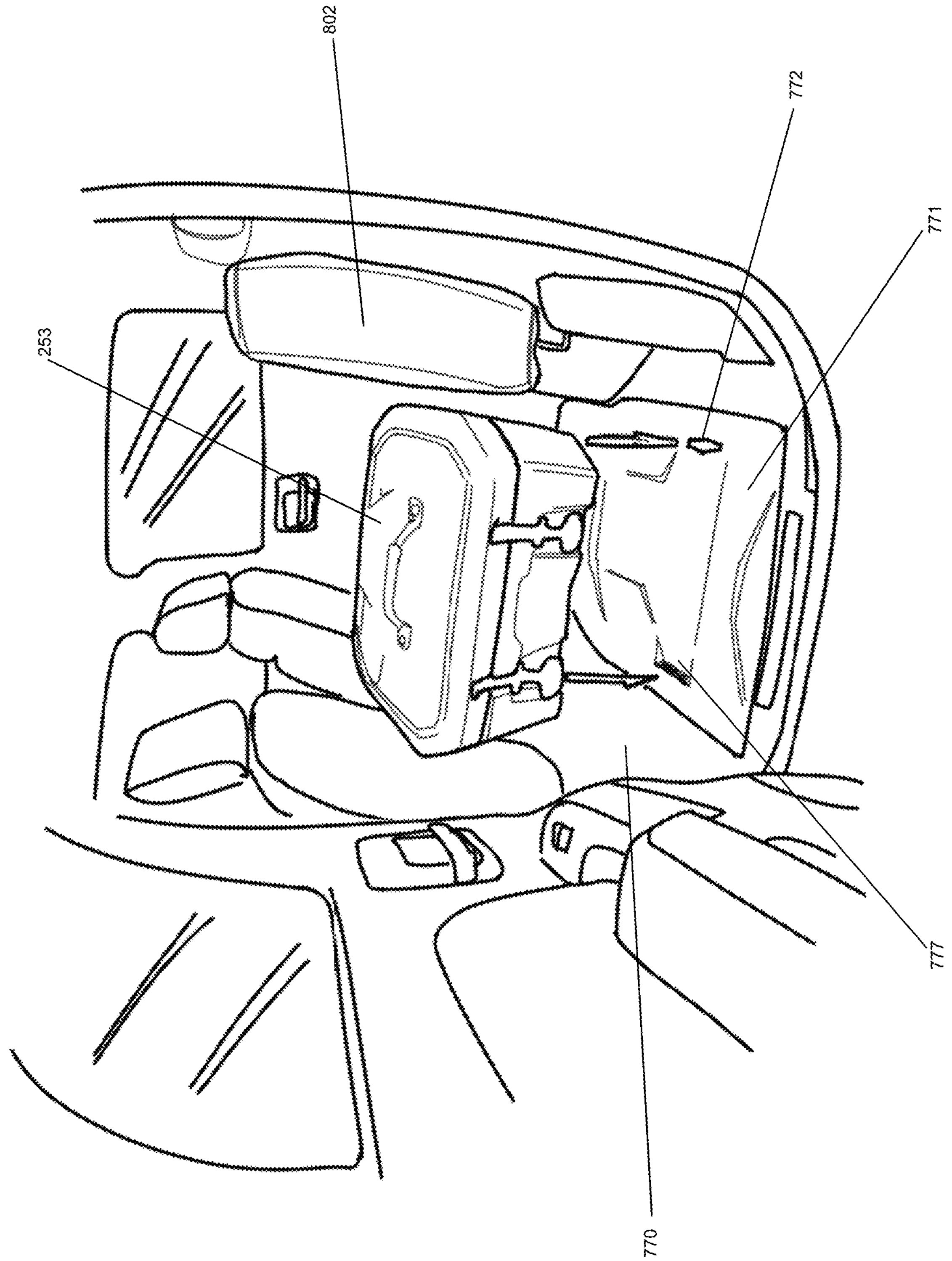
FIG. 16B is a perspective view of a box anchored to the floor covering of FIG. 16A.
Figure 16C:
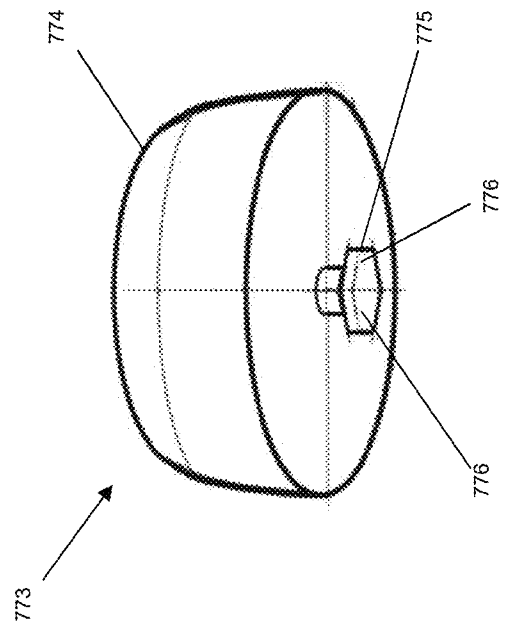
FIG. 16C is a perspective view of a dog bowl.

FIG. 16B shows the small box 253 fastened to the floor covering 771. The small box 253 is fastened to one aperture 772 using built-in anchors and sits in one recess 777. FIG. 16C shows a dog bowl 773 that can be fastened to any of the apertures described herein, including the floor covering apertures 772. The dog bowl 773 has a bowl 774 and an anchoring element 775 defining cams 776 that functions in the same way as the anchoring element 711 described above. The cams 776 have the same size and shape as the cams 142 of the anchor 100. The dog bowl 773 can be locked in place by being placed into an aperture and then rotated.

Figure 17:
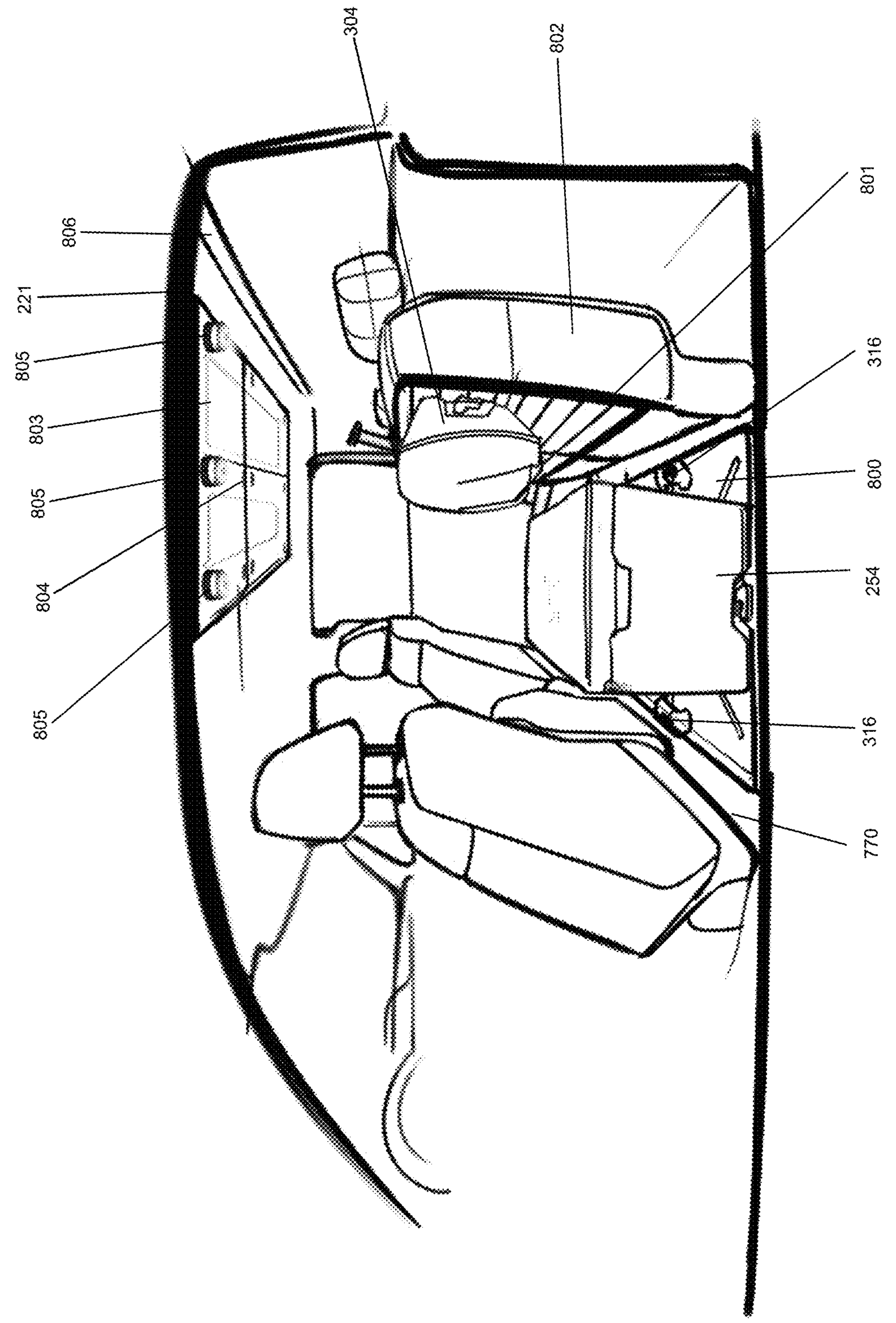
FIG. 17 is a perspective view of paneling inside a vehicle.

Turning to FIG. 17, a floor panel 800 is placed on the backseat floor 770, a seat panel 801 is placed on the underside of a backseat 802, and a ceiling panel 803 is placed on the ceiling 806 of the pickup truck cab 221. The floor panel 800 has fixtures 316 on its top side, which allow for the attachment of the anchor 100 or attachments with built-in anchors. The seat panel 801 and the ceiling panel 803 have several panel apertures 804 which can accept an anchor 100 or accessories with built-in anchors. The floor panel 800 is rectangular and stretches the width of the backseat floor 770. The seat panel 801 is rectangular and is as long and wide as the backseat 802. The ceiling panel 803 is rectangular and no wider than the ceiling 806. The floor panel 800 and the seat panel 801 are accessible when the backseat 802 has been moved to a stowed position as shown in FIG. 17. FIG. 17 shows the large box 254 attached to the floor panel 800 using built-in anchors fastened to the fixtures 316. The bag 304 is attached to the seat panel 801 using built-in anchors. Small ceiling lights 805 are attached to the ceiling panel 803. The ceiling lights are circular and have an anchoring element that functions in the same way as the anchoring element 711.

Figure 18:
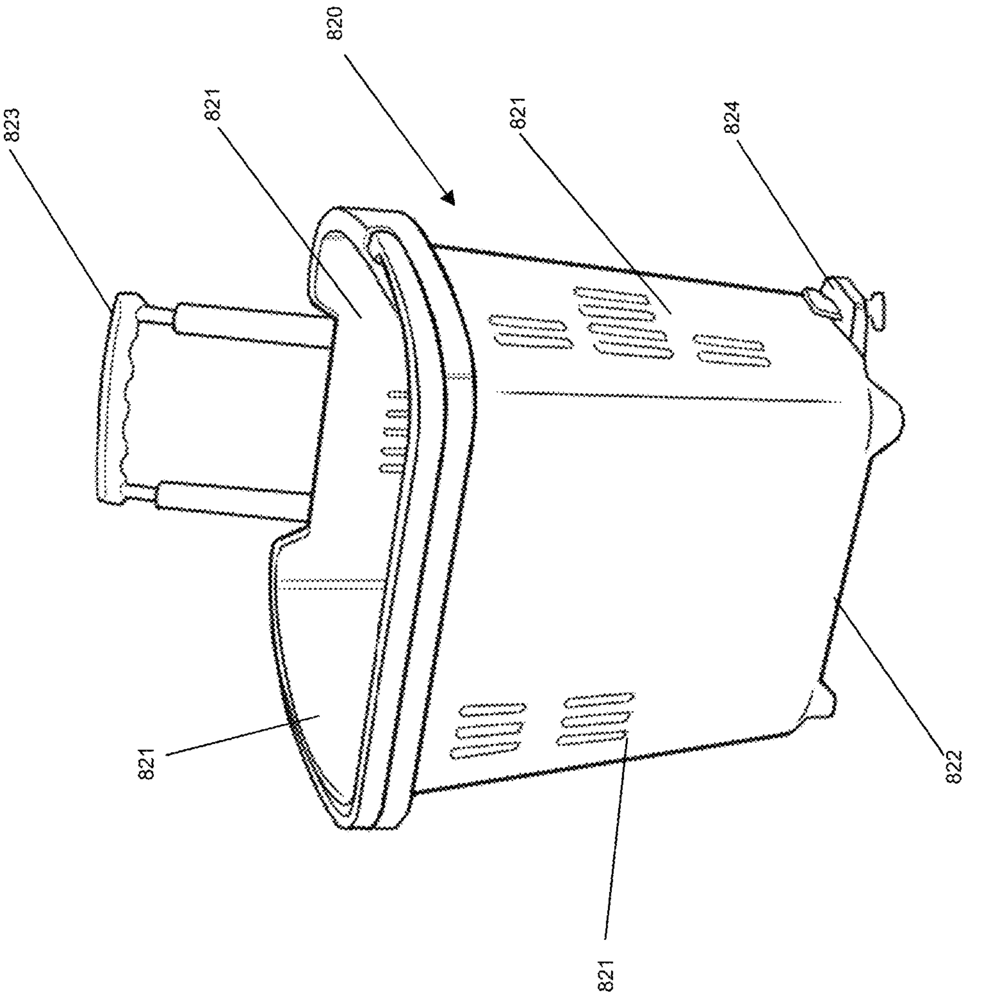
FIG. 18 is a perspective view of a shopping basket.

FIG. 18 shows a grocery basket 820 that can be fastened to the floor covering 771 or floor panel 800. The basket 820 has four basket side walls 821, a basket base 822 and a handle 823. The grocery basket 820 also has anchoring elements 824 near the basket base 822. The anchoring elements 824 function in the same fashion as the anchors 100. This allows for the grocery basket 820 to be fastened to any of the apertures described herein, for example the floor covering apertures 772 and the cab panel apertures 804.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A rack system for a vehicle, the vehicle having a cargo space for cargo storage, the rack system comprising:

a lining comprising:

a first lining side wall configured to extend on a left side of the vehicle, the first lining side wall having defined therein a plurality of left-side apertures spaced from one another in a longitudinal direction of the first lining side wall;

a second lining side wall configured to extend on a right side of the vehicle, the second lining side wall having defined therein a plurality of right-side apertures spaced from one another in the longitudinal direction of the second lining side wall;

a left side foot assembly comprising:

a left anchoring element portion for removably attaching the left side foot assembly to the first lining side wall through one of the plurality of left-side apertures, and a left foot portion connected to the left anchoring element;

a right side foot assembly comprising:

a right anchoring element portion for removably attaching the right side foot assembly to the second lining side wall through one of the plurality of right-side apertures, and a right foot portion connected to the right anchoring element; and at least one support member connectable to the left foot portion and to the right foot portion.

2. The rack system of claim 1, wherein the at least one support member comprises a horizontal bar configured to extend between the left side foot assembly and the right side foot assembly.

3. The rack system of claim 2, wherein:

the left side foot assembly is a front left side foot assembly;

the right side foot assembly is a front right side foot assembly; and the crossbar is a front crossbar; and further comprising:

a rear left side foot assembly;

a rear right side foot assembly; and a rear crossbar configured to extend between the rear left side foot assembly and the rear right side foot assembly.

4. The rack system of claim 3, wherein:

the front crossbar and the rear crossbar are arranged and configured to support a bike; and further comprising bike straps for attaching wheels of the bike to the front and rear crossbars.

5. The rack system of claim 3, wherein each of the front crossbar and the rear crossbar has defined therein a plurality of apertures for receiving accessory anchors therein.

6. The rack system of claim 1, wherein:

the left side foot assembly is a front left side foot assembly;

the right side foot assembly is a front right side foot assembly; and further comprising:

a rear left side foot assembly; and a rear right side foot assembly, the support member comprising a panel connectable to a corresponding foot portion of the front left side foot assembly, the front right side foot assembly, the rear left side foot assembly and the rear right side foot assembly, the support member being configured to extend generally parallel to a floor of the cargo space.

7. The rack system of claim 6, wherein the panel comprises at least one aperture for receiving an accessory anchor.

8. The rack system of claim 1, wherein:

the left anchoring element and the left foot of the left side foot assembly are fastened to one another, and the right anchoring element and the right foot of the right side foot assembly are fastened to one another.

9. The rack system of claim 1, wherein:

the first side lining wall comprises a side surface and an upper surface; and the second side lining wall comprises a side surface and an upper surface.

10. The rack system of claim 9, wherein:

the plurality of left-side apertures is defined in the upper surface of the first side lining wall; and the plurality of right-side apertures is defined in the upper surface of the second side lining wall.

11. The rack system of claim 9, wherein:

the plurality of left-side apertures is defined in the side surface of the first side lining wall; and the plurality of right-side apertures is defined in the side surface of the second side lining wall.

12. The rack system of claim 9, wherein each of the first side lining wall and the second side lining wall has an inverted L-shape.

13. The rack system of claim 1, wherein:

the vehicle comprises a tonneau defining the cargo space; and the first lining side wall and the second lining side wall are configured to be inserted into the tonneau.

14. The rack system of claim 13, wherein each of the first side lining wall and the second side lining wall is configured to contact a respective one of a first side wall of the tonneau and a second side wall of the tonneau when inserted into the tonneau.

15. The rack system of claim 13, wherein each of the first side lining wall and the second side lining wall is configured to contact a respective top edge of the tonneau.

16. The rack system of claim 13, wherein the at least one support member is configured to extend above side walls of the tonneau.

17. The rack system of claim 1, wherein a span of the at least one support member in the widthwise direction of the vehicle is no greater than a width of the vehicle.

18. The rack system of claim 1, wherein the lining comprises a front wall connecting the first side lining wall and the second side lining wall.

19. The rack system of claim 1, wherein each of the left anchoring element portion and the right anchoring element portion comprises:

a case;

a lever; and a latch having a generally cylindrical latch body and a pair of cams, the lever being connected to the latch body, the case housing at least a portion of the latch body.

20. The rack system of claim 19, wherein:

for each of the left anchoring element portion and the right anchoring element portion, the case has an elongated hexagonal footprint, and at least one aperture of the plurality of left-side apertures and the plurality of right-side apertures has an elongated hexagonal shape to receive the case therethrough.

* * * * *